United States Patent
Horiuchi et al.

(10) Patent No.: US 9,226,313 B2
(45) Date of Patent: Dec. 29, 2015

(54) TRANSMISSION DEVICE, RECEIVING DEVICE, TRANSMISSION METHOD AND RECEIVING METHOD

(75) Inventors: Ayako Horiuchi, Kanagawa (JP); Akihiko Nishio, Kanagawa (JP); Yoshiko Saito, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 111 days.

(21) Appl. No.: 13/819,556

(22) PCT Filed: Mar. 16, 2012

(86) PCT No.: PCT/JP2012/001855
§ 371 (c)(1),
(2), (4) Date: Feb. 27, 2013

(87) PCT Pub. No.: WO2012/132295
PCT Pub. Date: Oct. 4, 2012

(65) Prior Publication Data
US 2013/0155996 A1 Jun. 20, 2013

(30) Foreign Application Priority Data

Mar. 31, 2011 (JP) ................................ 2011-077943

(51) Int. Cl.
*H04W 72/04* (2009.01)
*H04W 72/12* (2009.01)
(Continued)

(52) U.S. Cl.
CPC ......... *H04W 72/1294* (2013.01); *H04L 5/0053* (2013.01); *H04W 72/0406* (2013.01); *H04W 84/047* (2013.01)

(58) Field of Classification Search
CPC ................... H04W 72/0406; H04W 72/1294; H04W 56/003; H04W 72/0493; H04W 72/1289; H04W 72/042; H04W 72/04; H04W 28/06; H04W 84/047; H04W 72/121; H04W 72/1273; H04W 72/1284; H04W 72/0413; H04L 5/14; H04L 5/0051; H04L 5/0092; H04L 5/003; H04L 5/0094; H04L 5/0035; H04L 5/0091; H04L 5/0048; H04L 5/0007; H04L 1/1861; H04L 1/1854; H04L 5/0044; H04L 5/0053–5/0057; H04B 7/155
USPC .......... 370/329, 279, 315, 330, 328; 375/260; 455/561, 422.1
See application file for complete search history.

(56) References Cited

U.S. PATENT DOCUMENTS

2010/0002647 A1 1/2010 Ahn et al.
2010/0067465 A1 3/2010 Miki et al.
(Continued)

FOREIGN PATENT DOCUMENTS

CN 101496370 A 7/2009
CN 101669304 A 3/2010
(Continued)

OTHER PUBLICATIONS

English translation of Search Report for Chinese Patent Application No. 201280002018.4 dated Aug. 24, 2015.

*Primary Examiner* — Marcus R Smith
*Assistant Examiner* — Rose Clark
(74) *Attorney, Agent, or Firm* — Pearne & Gordon LLP

(57) ABSTRACT

A base station (100) transmits a DL grant for a terminal (200) by mapping it to an R-PDCCH region, thus transmitting a series of data groups to the terminal (200) by the SPS method. A transmission control unit (102) sets in the R-PDCCH region a control resource region which maps a data resource and the DL grant in a resource block group common in frames to be transmitted by the SPS method.
A resource region which was defined as a control resource region in a first frame to be transmitted among a plurality of frames to be transmitted is defined as a data resource in a second or subsequent frame to be transmitted.

16 Claims, 29 Drawing Sheets

FIRST SPS

(51) Int. Cl.
*H04L 5/00* (2006.01)
*H04W 84/04* (2009.01)

(56) References Cited

U.S. PATENT DOCUMENTS

| | | | |
|---|---|---|---|
| 2011/0044391 A1* | 2/2011 | Ji et al. | 375/260 |
| 2011/0051681 A1* | 3/2011 | Ahn et al. | 370/330 |
| 2011/0069637 A1* | 3/2011 | Liu et al. | 370/254 |
| 2011/0255485 A1* | 10/2011 | Chen et al. | 370/329 |
| 2011/0268064 A1* | 11/2011 | Chen et al. | 370/329 |
| 2011/0274031 A1* | 11/2011 | Gaal et al. | 370/315 |
| 2012/0039283 A1* | 2/2012 | Chen et al. | 370/329 |
| 2012/0051270 A1* | 3/2012 | Chen et al. | 370/279 |
| 2012/0113942 A1 | 5/2012 | Kim | |
| 2012/0120891 A1* | 5/2012 | Mazzarese et al. | 370/329 |
| 2012/0207099 A1* | 8/2012 | Lindh et al. | 370/329 |
| 2012/0320816 A1* | 12/2012 | Kim et al. | 370/315 |
| 2013/0230015 A1* | 9/2013 | Hoymann et al. | 370/329 |
| 2014/0219212 A1* | 8/2014 | Seo et al. | 370/329 |

FOREIGN PATENT DOCUMENTS

| | | |
|---|---|---|
| CN | 101682492 A | 3/2010 |
| WO | 2008/014511 A2 | 1/2008 |
| WO | 2011/004989 A2 | 1/2011 |

* cited by examiner

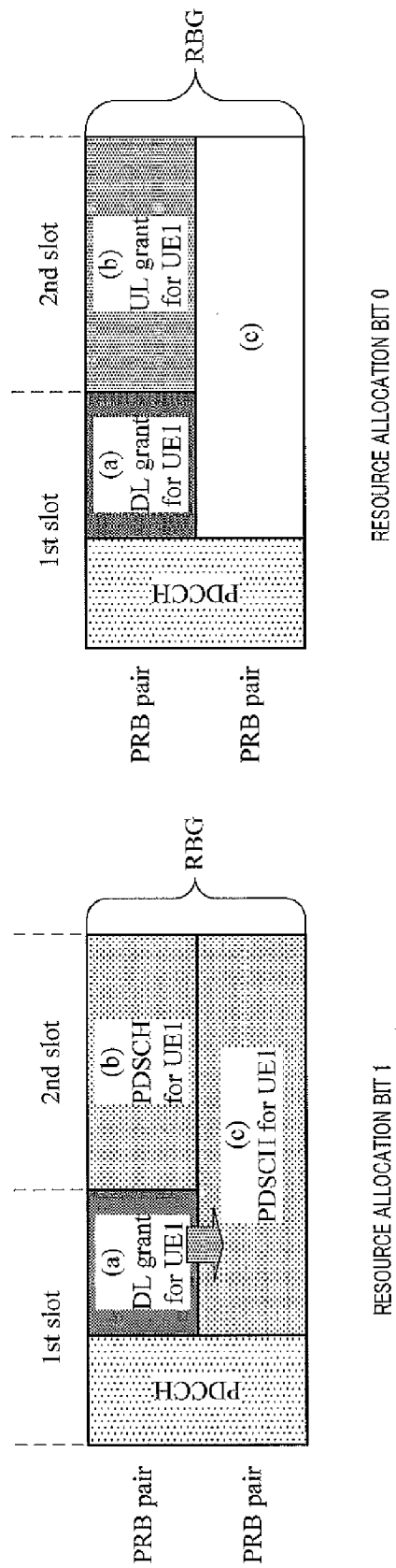

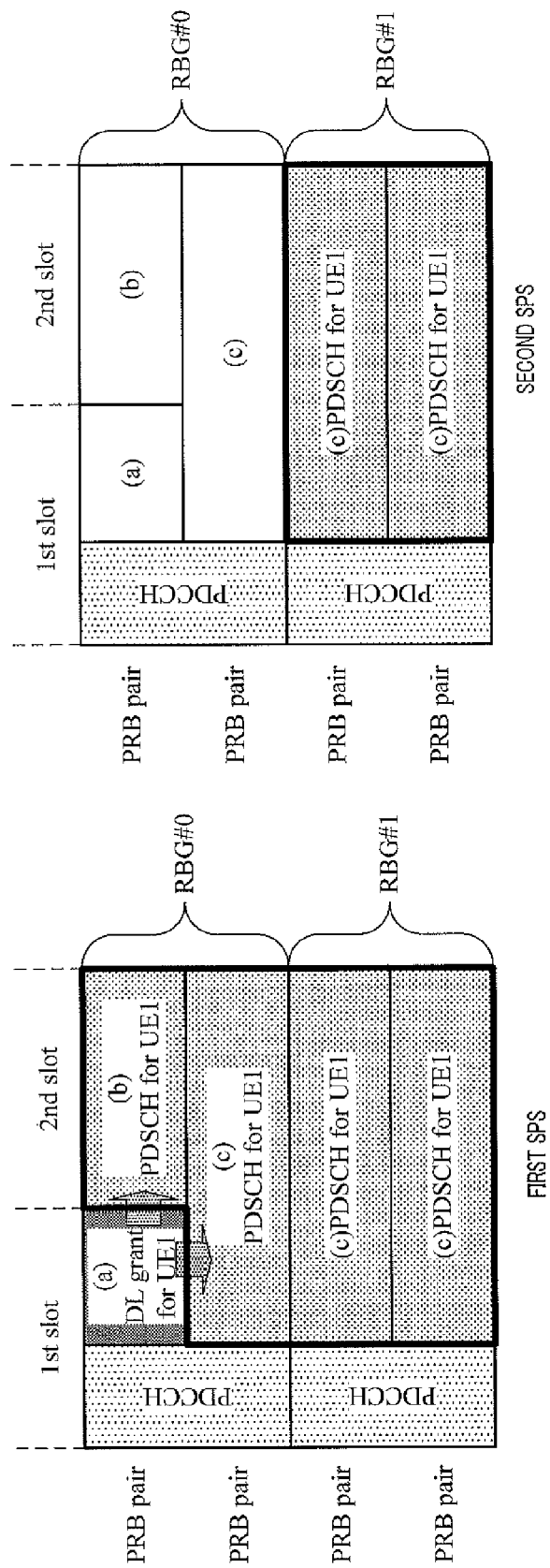

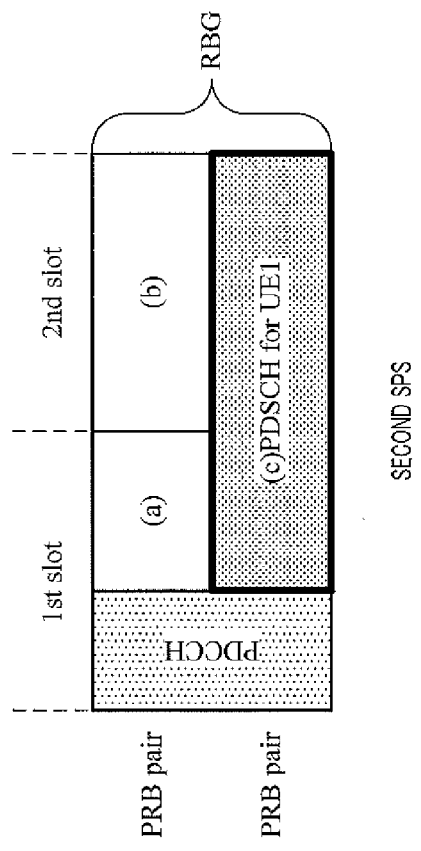
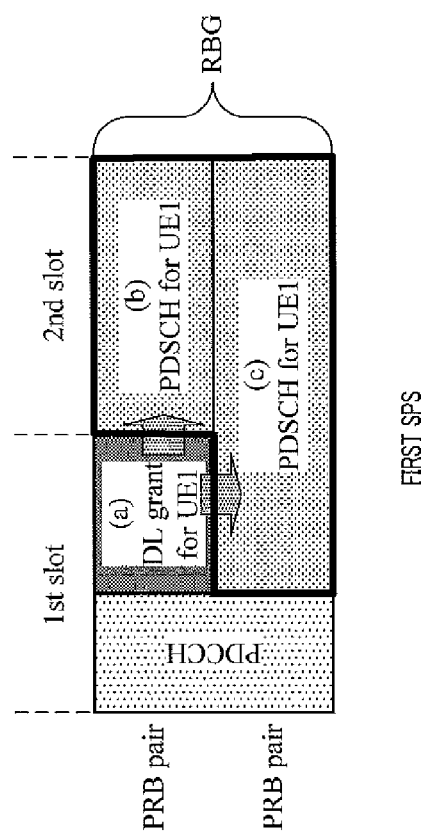
FIG. 11B
FIG. 11A

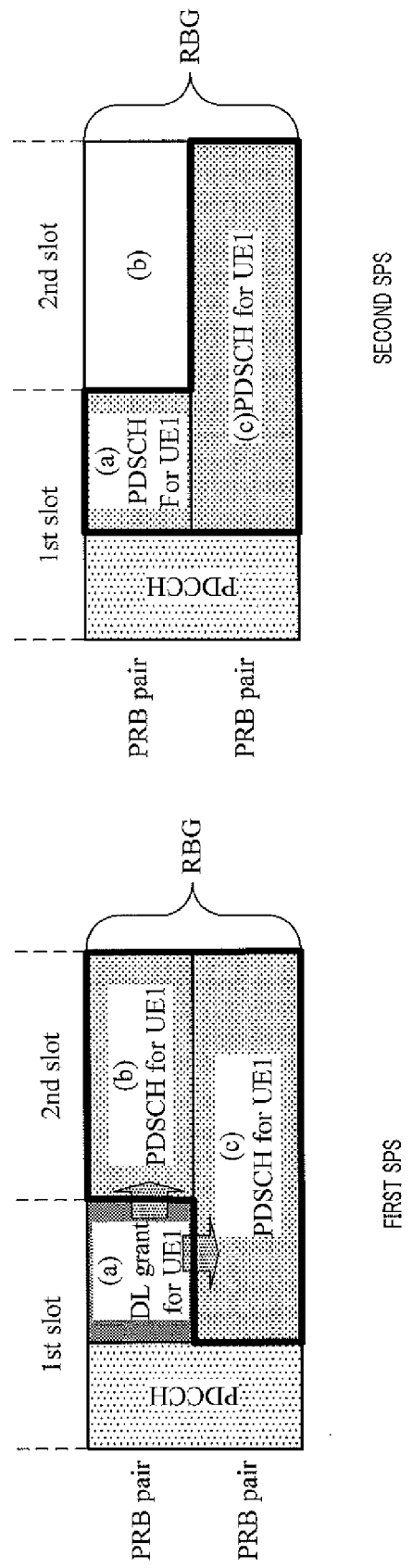

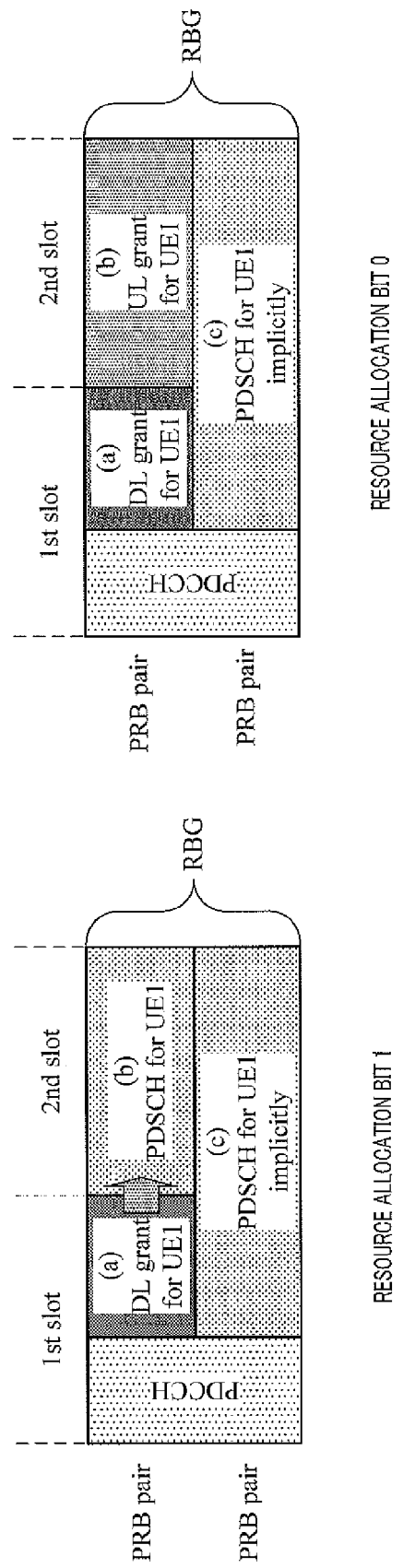

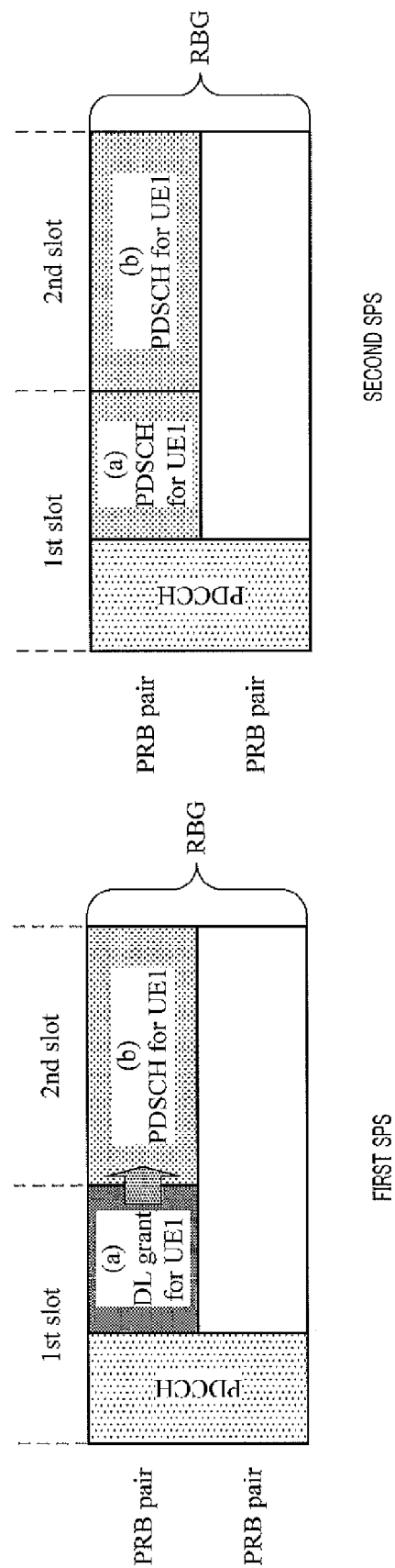

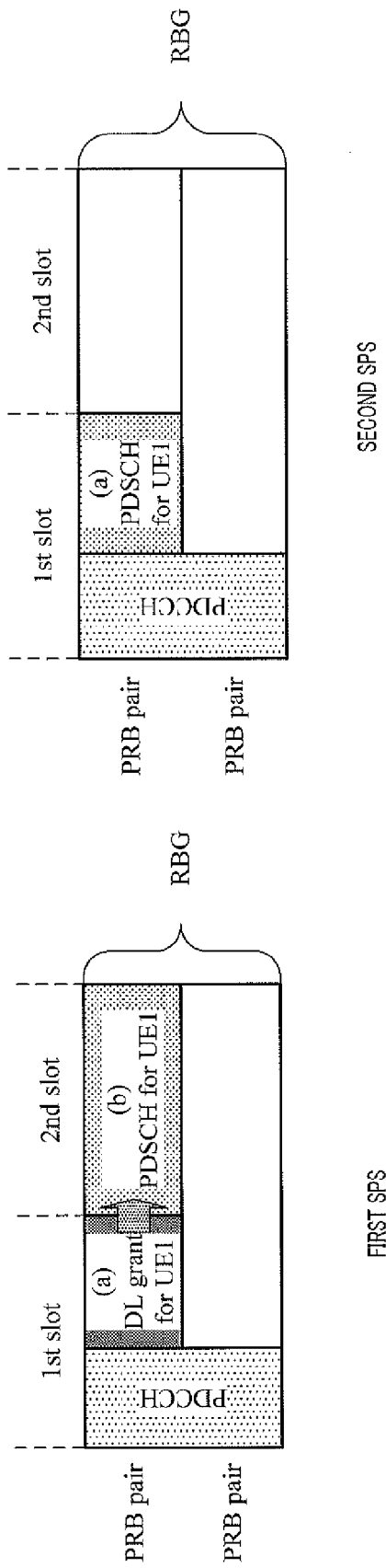

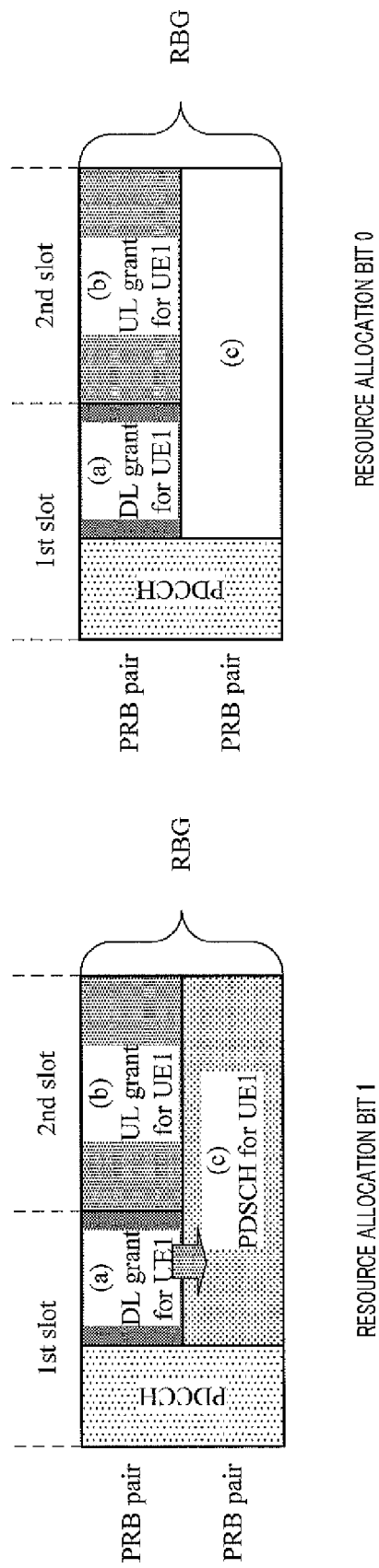

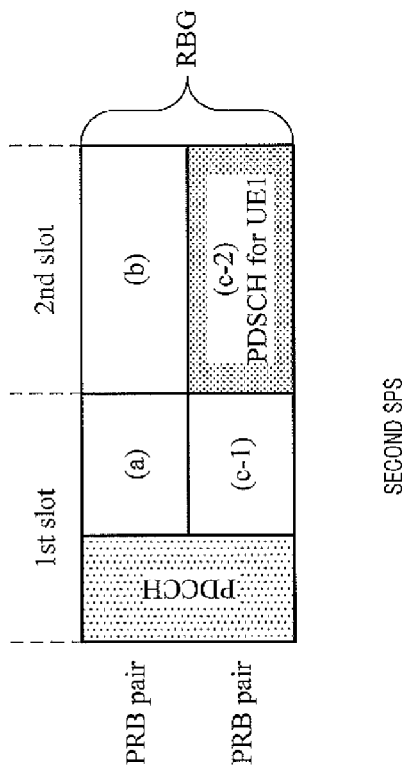
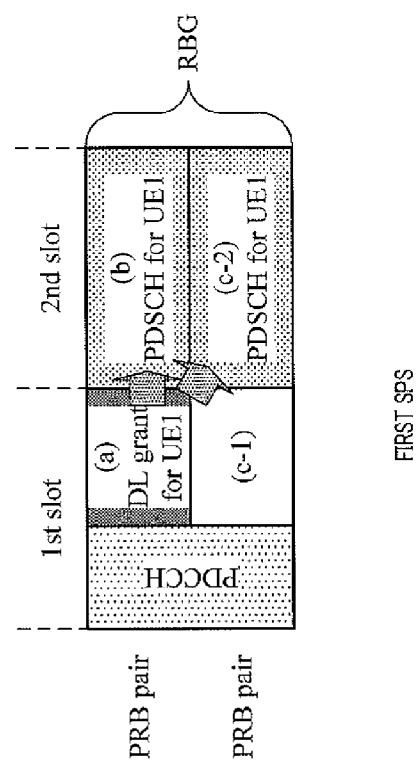
FIG. 21B
FIG. 21A

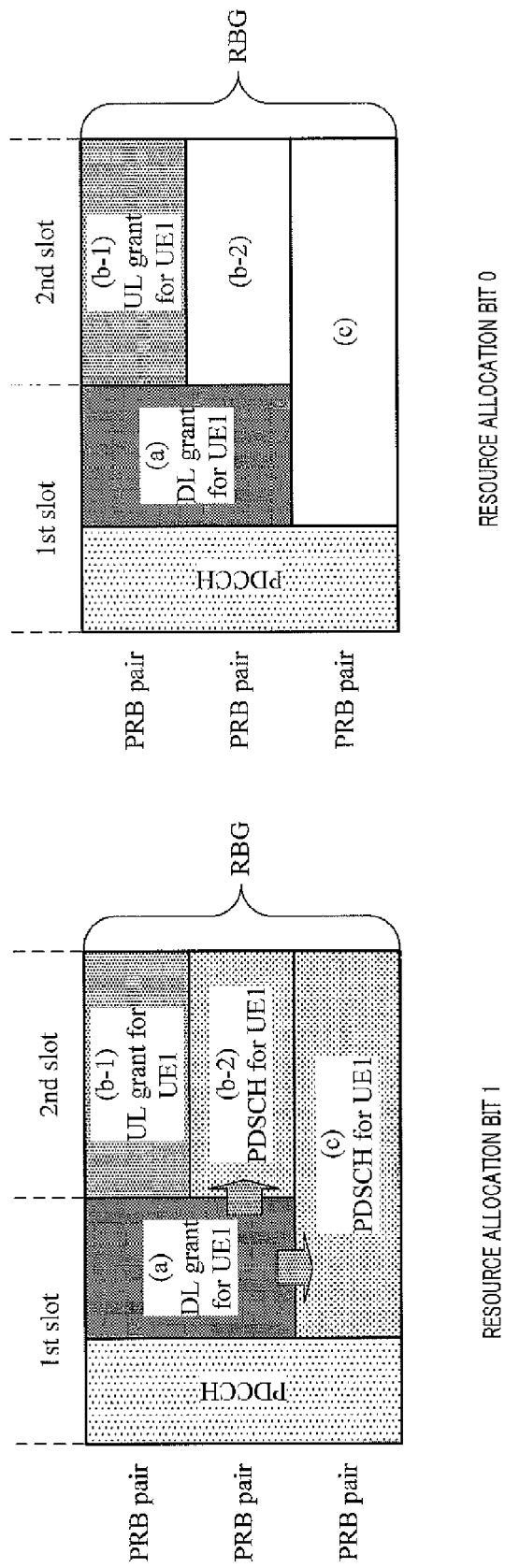

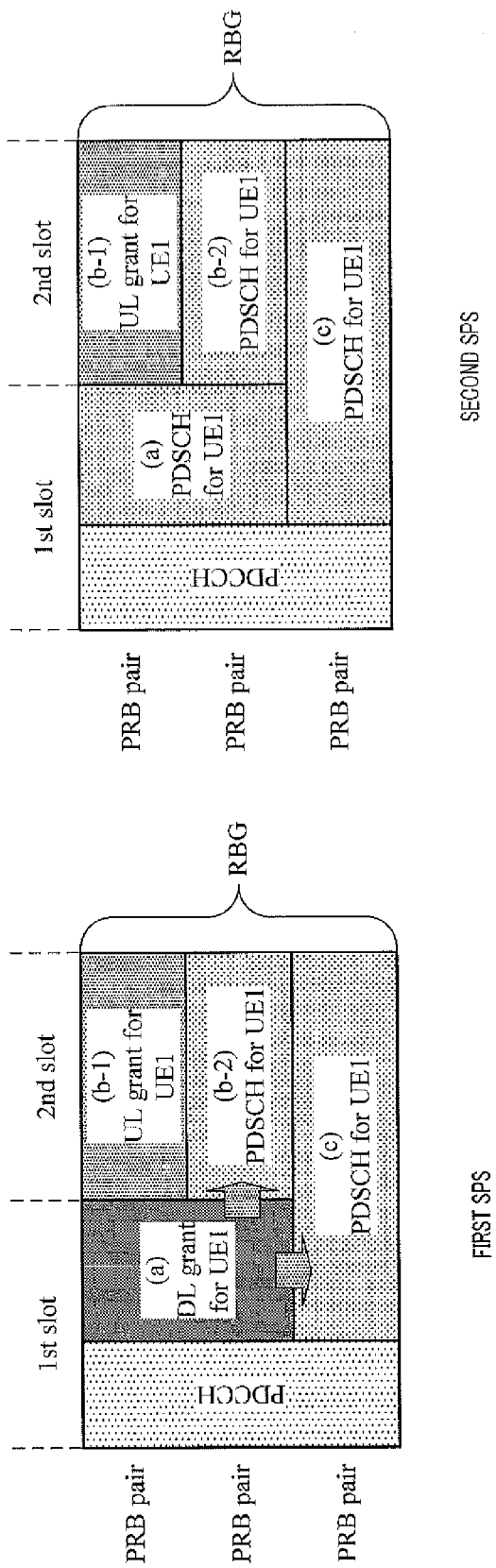

TRANSMISSION DEVICE, RECEIVING DEVICE, TRANSMISSION METHOD AND RECEIVING METHOD

TECHNICAL FIELD

The claimed invention relates to a transmission apparatus, a reception apparatus, a transmission method, and a reception method.

BACKGROUND ART

In recent years, it has become common to transmit large-volume data, such as still image data and moving image data in addition to audio data in cellular mobile communication systems, in response to spread of multimedia information. Active studies associated with techniques for achieving a high transmission rate in a high-frequency radio band has been conducted to achieve large-volume data transmission.

When a high frequency radio band is utilized, however, attenuation increases as the transmission distance increases, although a higher transmission rate can be expected within a short range. Accordingly, the coverage area of a radio communication base station apparatus (hereinafter, abbreviated as "base station") decreases when a mobile communication system using a high frequency radio band is actually put into operation. Thus, more base stations need to be installed in this case. The installation of base stations involves reasonable costs, however. For this reason, there has been a high demand for a technique that provides a communication service using a high-frequency radio band, while limiting an increase in the number of base stations.

In order to meet such a demand, studies have been carried out on a relay technique in which a radio communication relay station apparatus (hereinafter, abbreviated as "relay station") is installed between a base station and a radio communication mobile station apparatus (hereinafter, abbreviated as "mobile station") to perform communication between the base station and mobile station via the relay station for the purpose of increasing the coverage area of each base station. The use of relay technique allows a mobile station not capable of directly communicating with a base station to communicate with the base station via a relay station.

An LTE-A (long-term evolution advanced) system for which the introduction of the relay technique described above has been studied is required to maintain compatibility with LTE (long term evolution) in terms of a smooth transition from and coexistence with LTE. For this reason, mutual compatibility with LTE is required for the relay technique as well.

FIG. 1 illustrates example frames in which control signals and data are assigned in the LTE system and the LTE-A system.

In the LTE system, DL (downlink) control signals from a base station to a mobile station are transmitted through a DL control channel, such as PDCCH (physical downlink control channel). In LTE, DL grant indicating DL data assignment and UL (uplink) grant indicating UL data assignment are transmitted through PDCCH. DL grant reports that a resource in the subframe in which the DL grant is transmitted has been allocated to the mobile station. Meanwhile, in an FDD system, UL grant reports that a resource in the fourth subframe after the subframe in which the UL grant is transmitted has been allocated to the mobile station. In a TDD system, UL grant reports that the resource in a subframe transmitted after four or more subframes from the subframe in which the UL grant is transmitted has been allocated to the mobile station. In the TDD system, the subframe to be assigned to the mobile station, or the number of subframes before the assigned subframe in which the UL grant is transmitted is determined in accordance with the time-division pattern of the UL and DL (hereinafter referred to as "UL/DL configuration pattern"). Regardless of the UL/DL configuration pattern, the UL subframe is a subframe after at least four subframes from the subframe in which the UL grant is transmitted.

In the LTE-A system, relay stations, in addition to base stations, also transmit control signals to mobile stations in PDCCH regions in the top parts of subframes. With reference to a relay station, DL control signals have to be transmitted to a mobile station. Thus, the relay station switches the processing to reception processing after transmitting the control signals to the mobile station to prepare for receiving signals transmitted from the base station. The base station, however, transmits DL control signals to the relay station at the time the relay station transmits the DL control signals to the mobile station. The relay station therefore cannot receive the DL control signals transmitted from the base station. In order to avoid such inconvenience in the LTE-A, studies have been carried out on providing a region in which downlink control signals for relay stations are located (i.e., relay PDCCH (R-PDCCH) region) in a data region as illustrated in FIG. 2 in LTE-A. Similar to the PDCCH, locating DL grant and UL grant on the R-PDCCH is studied. In the R-PDCCH, as illustrated in FIG. 1, locating the DL grant in the first slot and the UL grant in the second slot is studied (refer to Non-patent Literature 1). Locating the DL grant in the first slot reduces a delay in decoding the DL grant, and allows relay stations to prepare for ACK/NACK transmission for DL data (transmitted in the fourth subframes following reception of DL grant in FDD).

Each relay station finds the downlink control signals intended for the relay station by performing blind-decoding on downlink control signals transmitted using an R-PDCCH region from a base station within a resource region indicated using higher layer signaling from the base station (i.e., search space).

As described above, the base station notifies the relay station of the search space corresponding to the R-PDCCH by higher layer signaling. Notification of the search space corresponding to the R-PDCCH may be performed in two different ways: (1) notification using a PRB (physical resource block) pair as a single unit; or (2) notification using an RBG (resource block group) as a single unit. The term, "PRB (physical resource block) pair" refers to a set of PRBs in the first and second slots, whereas the term, "PRB" refers to an individual PRB in either the first or second slot. Hereinafter, a PRB pair may simply be referred to as "PRB." A resource block group (RBG) is a unit used when a plurality of PRBs are scheduled as a group. The size of an RBG is determined on the basis of the bandwidth of the communication system.

R-PDCCH has four aggregation levels, i.e., levels 1, 2, 4, and 8 (for example, refer to Non-patent Literature (hereinafter, abbreviated as "NFL") 1). Levels 1, 2, 4, and 8 respectively have six, six, two, and two mapping candidate positions. The term "mapping candidate position" refers to a candidate region to which control signals are to be mapped. When a single terminal is set with one aggregation level, control signals are actually mapped to one of the multiple mapping candidate positions of the aggregation level. FIG. 2 illustrates example search spaces corresponding to R-PDCCH. The ovals represent search spaces at various aggregation levels. The multiple mapping candidate positions in the search spaces at the different aggregation levels are continuous on VRBs (virtual resource blocks). The mapping candidate positions in the VRBs are mapped to PRBs (physical resource blocks) through higher layer signaling.

In the LTE system, data resources used for transmission of DL or UL data are scheduled by dynamic scheduling or SPS (semi-persistent scheduling). In dynamic scheduling, a base station notifies a terminal of a data resource in each subframe with DL or UL grant. In SPS, upon notification of a data resource from a base station to a terminal with first control signals (DL or UL grant), a series of data is transmitted using predetermined resources in a group of transmission-scheduled subframes until the end of SPS is notified by second control signals. In SPS, two consecutive frames in the group of transmission-scheduled subframes have a predetermined frame interval. The predetermined resources are common between the transmission-scheduled subframes. In SPS, if dynamic scheduling of the data resources is indicated in any subframe in the group of transmission-scheduled subframes, a priority is given to the dynamic scheduling of the subframe, while data transmission of the data resource scheduled by SPS is skipped. SPS is suitable for communication involving small consecutive packets. An example communication involving small consecutive packets is speech communication. SPS applied to audio communication can eliminate the need for indication of the data resources used for mapping small packets using control signals every time, and thus can prevent an increase in the overhead of the control signals relative to the number of packets.

CITATION LIST

Non Patent Literature

NPL 1
3GPP TSG-RAN WG1 Meeting, R1-106478, "Capturing of further agreements on relaying" November 2010

SUMMARY OF INVENTION

Technical Problem

Given the introduction of various apparatuses as radio communication terminals in the future M2M (machine to machine) communication, for example, there is a concern for a shortage of resources in the mapping region for PDCCH (i.e., "PDCCH region") due to an increase in the number of terminals. If PDCCH cannot be mapped due to such a resource shortage, the DL data cannot be scheduled for the terminals. Thus, the resource region for mapping DL data (i.e., "PDCCH (physical downlink shared channel) region") cannot be used even if there is an available region, possibly causing a decrease in the system throughput. Studies have been carried out to solve such resource shortage through locating control signals for terminals served by a base station in a data region to which R-PDCCH is mapped (i.e., "R-PDCCH region for terminals"). Locating the control signals in a data region in such a manner enables transmission power control for control signals transmitted to terminals near a cell edge or interference control for interference to another cell by control signals to be transmitted or interference to the cell from another cell.

The search space corresponding to R-PDCCH for terminals is a resource region to which the control signals transmitted from the base station to the terminals may be mapped. The search space corresponding to R-PDCCH is set for each terminal.

The SPS between base stations and terminals supported in the LTE system is also applied to the SPS between base stations and terminals in the LTE-A system. Thus, the SPS for the mapping of the control signals transmitted from base stations to terminals to R-PDCCH regions for the terminals need to be specified. The SPS for this case, however, has not yet been studied. It has already been determined that LTE-A does not support SPS between base stations and relay stations.

An object of the claimed invention is to provide a transmission apparatus, a reception apparatus, a transmission method, and a reception method that enable transmission of a series of data while the data is distributed to data resources in N transmission subframes (where N is a natural number greater than or equal to two) when control signals are transmitted in a resource region usable for a control channel or data channel.

Solution to Problem

A transmission apparatus according to an aspect of the claimed invention maps control signals for a reception apparatus to a first resource region usable for a control channel or a data channel or to a second resource region usable for a control channel, transmits the mapped signals, and transmits a series of data to the reception apparatus while distributing the series of data to data resources in N transmission subframes (where N is a natural number greater than or equal to two), the transmission apparatus including: a generating section that generates scheduling control signals for the data resources; a setting section that sets the data resources, and a control resource region to which the scheduling control signals are mapped in the first resource region in a resource block group (RBG) being formed of M resource blocks (RBs) (where M is a natural number greater than or equal to two) and being common between the transmission subframes; and a mapping section that maps the series of data to the set data resources and maps the scheduling control signals to the control resource region, in which the setting section sets the resource region set as the control resource region in the first transmission subframe of the N transmission subframes to be the data resource in the transmission subframes except for the first transmission subframe.

A reception apparatus according to an aspect of the claimed invention receives reception signals including control signals transmitted from a transmission apparatus through a first resource region usable for a control channel or a data channel or a second resource region usable for a control channel and receives a series of data being transmitted from the transmission apparatus while being distributed to data resources in N transmission subframes (where N is a natural number greater than or equal to two), the reception apparatus including: a detecting section that detects scheduling control signals for the data resources included in the reception signals; and an extracting section that extracts, from the reception signals, a signal component in a data-component extraction target region corresponding to the data resource in a resource block group (RBG) formed of M resource blocks (RBs) (where M is a natural number greater than or equal to two) including an RB in which the scheduling control signals are detected, the resource block group (RBG) being common between the transmission subframes, in which the extracting section treats a resource region in which the scheduling control signals are detected in the first transmission subframe of the N transmission subframes as the data-component extraction target region in the transmission subframes except for the first transmission subframe.

A transmission method according to an aspect of the claimed invention is a method of mapping control signals for a reception apparatus in a first resource region usable for a control channel or a data channel or in a second resource region usable for a control channel, transmitting the mapped signals, and transmitting a series of data to the reception apparatus while distributing the series of data to data resources in N transmission subframes (where N is a natural number greater than or equal to two), the method including: generating scheduling control signals for the data resources; setting the data resources, and a control resource region to which the scheduling control signals are mapped in the first resource region in a resource block group (RBG) being formed of M resource blocks (RBs) (where M is a natural number greater than or equal to two) and being common between the transmission subframes; and mapping the series of data to the set data resources and mapping the scheduling control signals to the control resource region, wherein a resource region set as the control resource region in the first transmission subframe of the N transmission subframes is set as the data resources in the transmission subframes except for the first transmission subframe.

A reception method according to an aspect of the claimed invention is a method of receiving reception signals including control signals transmitted from a transmission apparatus through a first resource region usable for a control channel or a data channel or a second resource region usable for a control channel and receiving a series of data being transmitted from transmission apparatus while being distributed to data resources in N transmission subframes (where N is a natural number greater than or equal to two), the method including: detecting scheduling control signals for the data resources included in the reception signals; and extracting, from the reception signals, a signal component in a data-component extraction target region corresponding to the data resources in a resource block group (RBG) formed of M resource blocks (RBs) (where M is a natural number greater than or equal to two) including a RB in which the scheduling control signals are detected, the resource block group (RBG) being common between the transmission subframes, wherein a resource region in which the scheduling control signals are detected in the first transmission subframe of the N transmission subframes is to be the data-component extraction target region in the transmission subframes except for the first transmission subframe.

Advantageous Effects of Invention

The claimed invention can provide a transmission apparatus, a reception apparatus, a transmission method, and a reception method that enable transmission of a series of data while the data is distributed to data resources in N transmission subframes (where N is a natural number greater than or equal to two) when control signals are transmitted in a resource region usable for a control channel or data channel.

BRIEF DESCRIPTION OF DRAWINGS

FIGS. 3A and 3B are diagrams provided for data resource scheduling for a relay station;

FIGS. 10A and 10B are diagrams provided for describing a mapping resource pattern according to Embodiment 3 of the claimed invention;

FIGS. 11A and 11B are diagrams provided for describing a mapping resource pattern according to Embodiment 4 of the claimed invention;

FIGS. 12A and 12B are diagrams provided for describing a mapping resource pattern according to Embodiment 5 of the claimed invention;

FIGS. 13A and 13B are diagrams provided for describing PDSCH scheduling method 1 by DL grant;

FIGS. 16A and 16B are diagrams provided for describing a mapping resource pattern according to PDSCH scheduling method 2;

FIGS. 17A and 17B are diagrams provided for describing another mapping resource pattern according to PDSCH scheduling method 2;

FIGS. 18A and 18B are diagrams provided for describing PDSCH scheduling method 3 by DL grant;

FIGS. 21A and 21B are diagrams provided for describing another mapping resource pattern according to PDSCH scheduling method 4;

FIGS. 23A and 23B are diagrams provided for describing PDSCH scheduling method 5 by DL grant;

FIGS. 24A and 24B are diagrams provided for describing a mapping resource pattern according to PDSCH scheduling method 5;

DESCRIPTION OF EMBODIMENTS

In case of transmission of DL grant in an R-PDCCH region for a relay station from a base station so as to assign PDSCH in units of RBGs to the relay station, the DL grant and PDSCH may be located on the same RBG in a given subframe. That is, as illustrated in FIG. 3A, if DL grant is mapped to given RBG region (a) in a given subframe, regions (b) and (c) in the subframe are allocated to the PDSCH by the DL grant. The RBG is formed of M PRB pairs (where M is a natural number greater than or equal to two). Region (a) resides in a first PRB pair allocated to the DL grant (i.e., "allocated PRB" pair), in a first slot other than the PDCCH region. Region (b) belongs to a second slot in the allocated PRB pair and is provided as a search space for an UL grant. Region (c) resides among the M PRB pairs, which form the RBG including the allocated FRB pair, in a region other than the allocated PRB pair and the PDCCH region. As illustrated in FIG. 3A, if the RBG is allocated to the PDSCH, the value of the resource allocation bit of the RBG in the DL grant is set to "1".

In a case where DL and UL grants are mapped to the same RBG in a given subframe, the DL grant is mapped to region (a), and the UL grant is mapped to region (b), as illustrated in FIG. 3B. Regions (b) and (c) are not allocated to PDSCH. In such a case, zero is assigned to the value of the resource allocation bit for the RBG in the DL grant. Thus, a terminal that receives DL control signals can determine whether the resource scheduling is that illustrated in FIG. 3A or 3B depending on the value, i.e., zero or one, of the resource allocation bit in the DL grant intended for the terminal for each RBG.

Thus, similar to the R-PDCCH region for a relay station, in a case of transmission of a DL grant in an R-PDCCH region for a terminal from a base station so as to assign PDSCH in units of RBGs to the terminal, the DL grant and the PDSCH may be located on the same RBG in a given subframe. In a case where the DL grant and PDSCH are placed on the same RBG, region (a) is excluded as a resource for the PDSCH, while regions (b) and (c) are allocated to the PDSCH as resources. Thus, the number of resources for the PDSCH differs between a case where DL grant and PDSCH are located on the same RBG in a given subframe and a case where the DL grant in a given RBG in a given subframe is not mapped and regions (a), (b), and (c) are all allocated to the PDSCH as resources.

Resources of high channel quality are desirably allocated to the DL grant and DL data. In SPS, an assumption is made that the resources are mainly allocated to small data sets, such as VoIP. In a case of small data transmission, the data resource is located in the same RBG as the DL grant to desirably reduce the number of RBGs to be used. Thus, in SPS, DL grant according to SPS and the data resource allocated by the DL grant tend to located in the same RBG.

Figure 1:
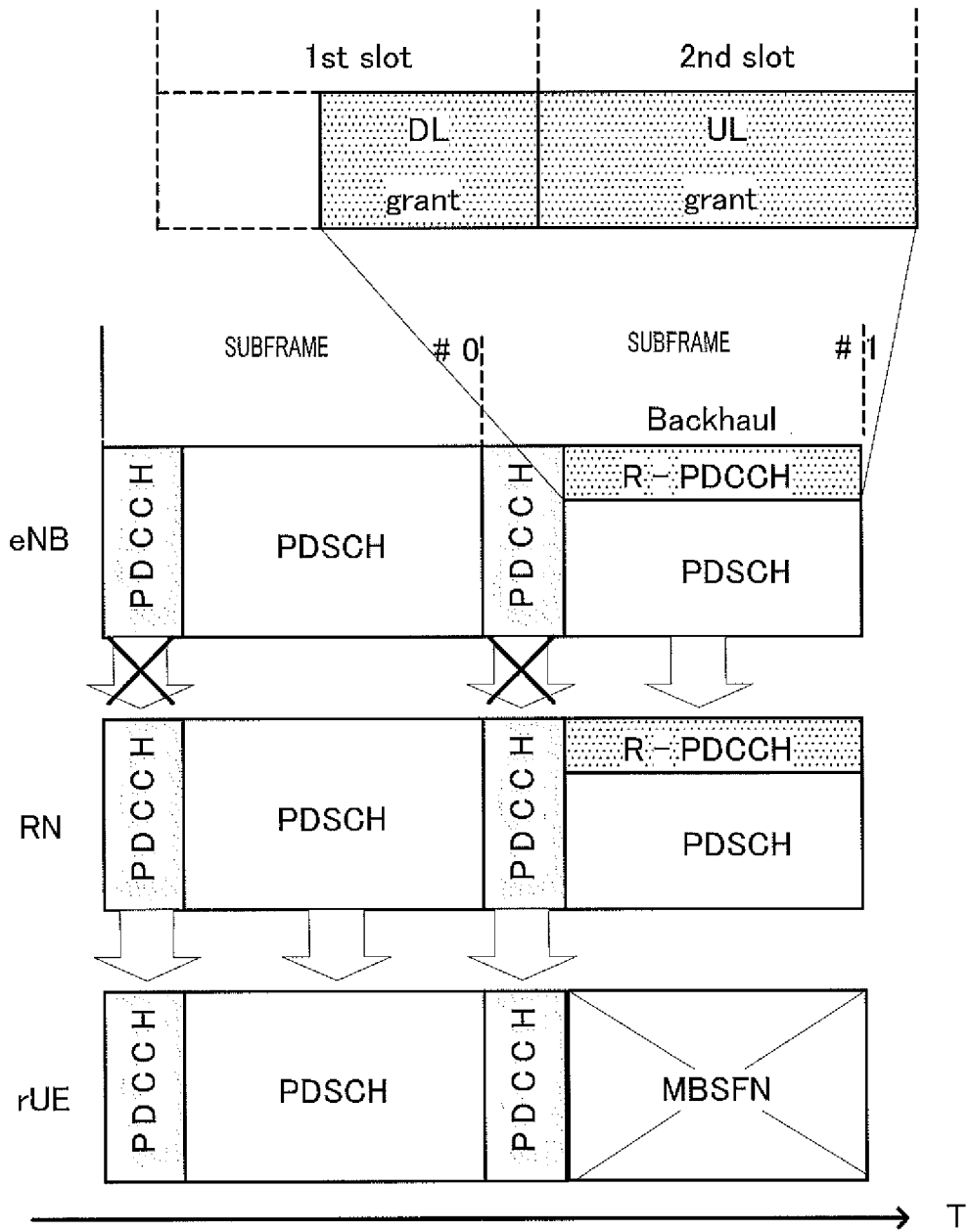
FIG. 1 illustrates example frames containing control signals and data assigned thereto, in the LTE system and the LTE-A system.
Figure 2:
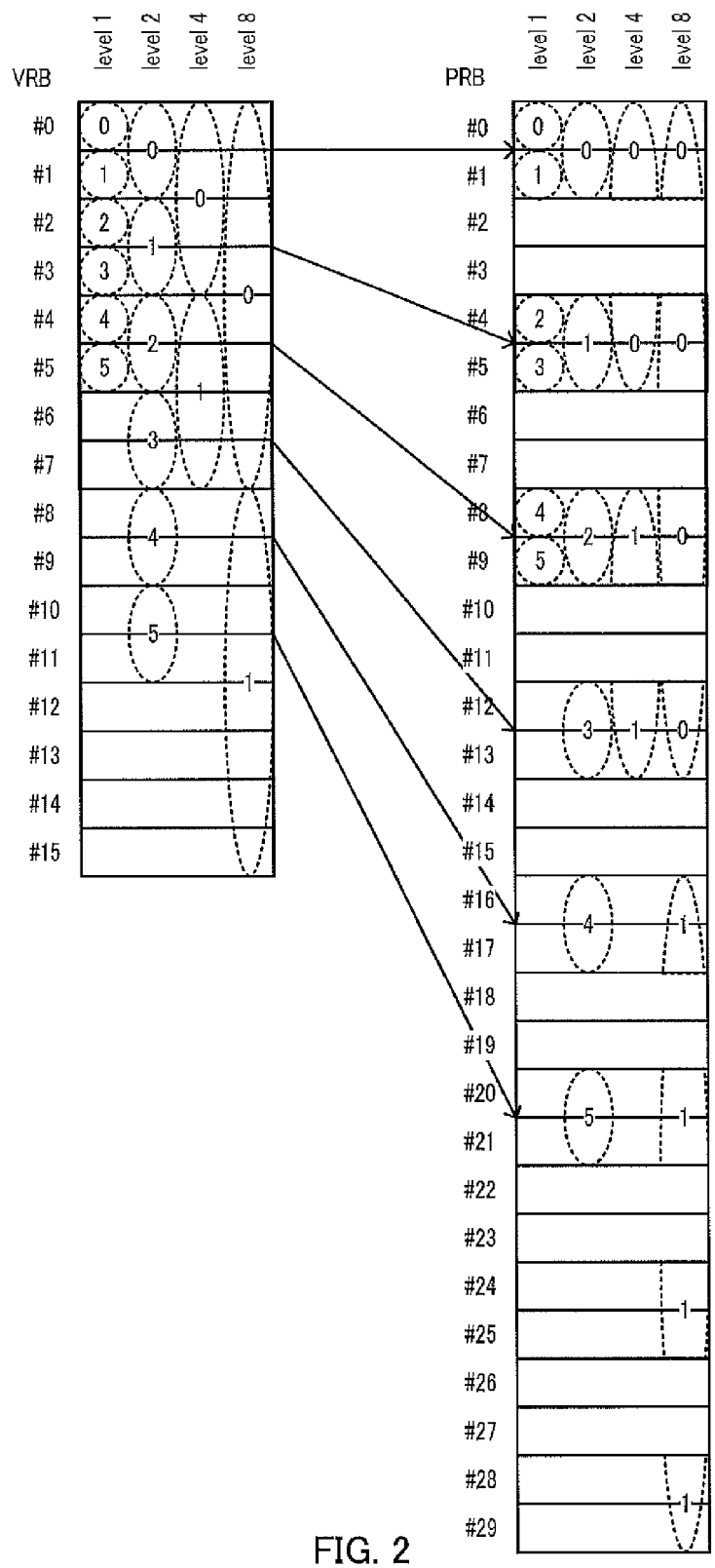
FIG. 2 illustrates example search spaces corresponding to R-PDCCH.
Figures 4A, 4B:
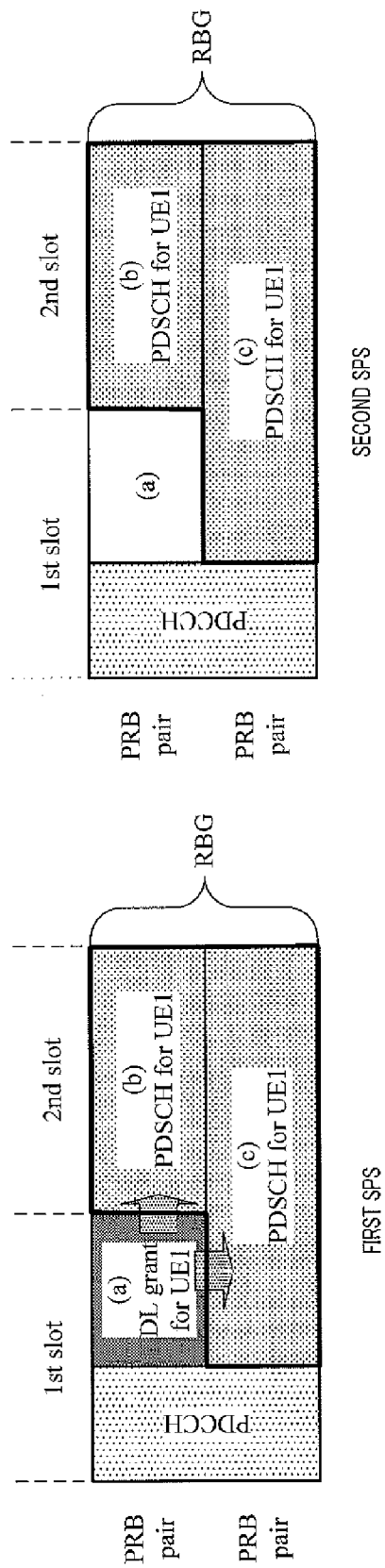
FIGS. 4A and 4B are diagrams illustrating an example data transmission method.

Accordingly, the inventors of this application have found the following problems occur in SPS in case of transmission of DL grant from a base station to assign PDSCH in units of RBGs to a terminal. In order for the PDSCH scheduling method illustrated in FIGS. 3A and 3B to be applied to SPS, data transmission method using data resources (i.e., regions (b) and (c)) scheduled for a first transmission-scheduled subframe (which is also referred to as "transmission subframe") in SPS, also in the second and subsequent transmission-scheduled subframes (see FIGS. 4A and B) may be possible. Such a data transmission method, however, creates wasted resources in the second and subsequent transmission-scheduled subframes in SPS because region (a) is not used as a data resource.

A first object of the claimed invention is to reduce the number of such wastefully unused resources. This object is achieved mainly through Embodiments 1, 2, and 5. For example, in Embodiment 1, region (a) is used as a data resource in the second and subsequent transmission-scheduled subframes in SPS. Such a data transmission method is particularly effective at a high aggregation level of R-PDCCH. This is because a high aggregation level leads to a larger number of allocated PRBs. For example, at R-PDCCH aggregation level 4, regions (a) in the four PRBs to which the DL grants are mapped in the first transmission-scheduled subframe can be used as PDSCH regions in the second and subsequent transmission-scheduled subframes.

The inventors of this application have also found that UL grant transmission is required even for DL data transmission target PRBs in transmission-scheduled subframes with SPS. Consequently, a second object of the claimed invention is to achieve DL data transmission with SPS that enables UL grant transmission even for DL data transmission target PRBs in transmission-scheduled subframes with SPS. This object is achieved mainly through Embodiments 3, 4, and 5.

Embodiments of the claimed invention will be described in detail with reference to the drawings. In the embodiments, the same elements will be assigned the same reference numerals, and any duplicate description of the elements is omitted.

Embodiment 1

Overview of Communication System

A communication system according to Embodiment 1 of the claimed invention includes a transmission apparatus and a reception apparatus. Specifically, in this embodiment of the claimed invention, a description will be provided while the transmission apparatus is referred to as base station 100, and the reception apparatus is referred to as terminal 200. The communication system is an LTE-A system, for example. Base station 100 is an LTE-A base station, and terminal 200 is an LTE-A terminal, for example.

Figure 5:
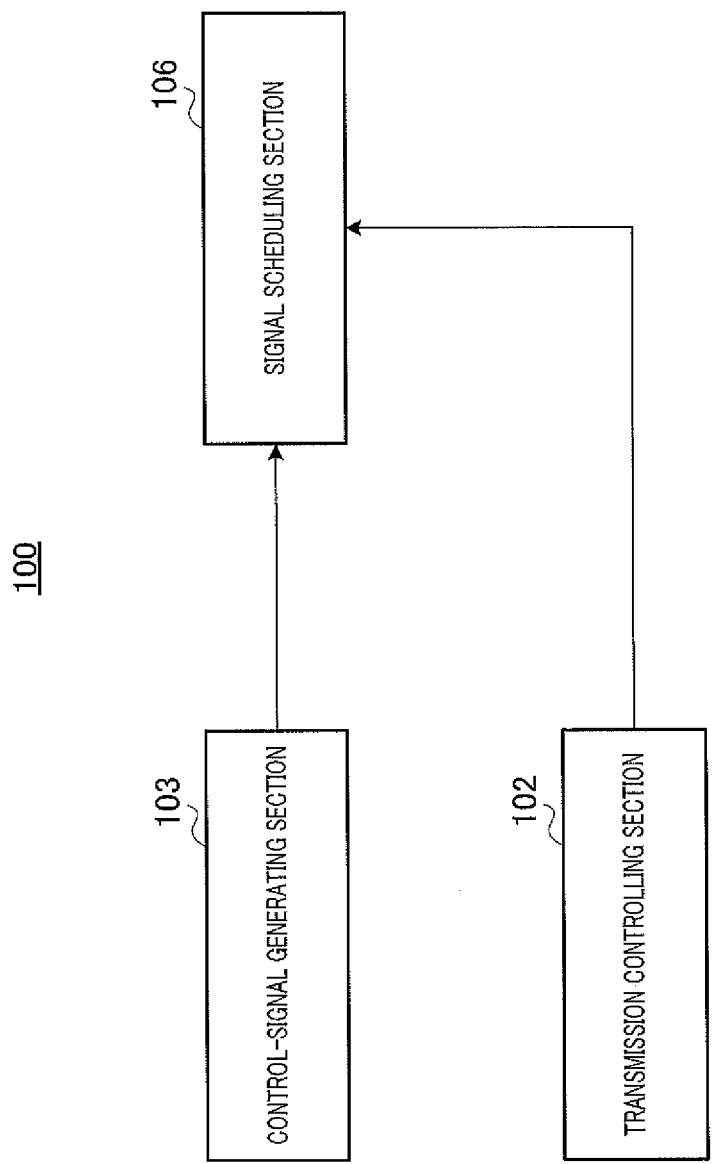
FIG. 5 is a main configuration diagram of a base station according to Embodiment 1 of the claimed invention.

FIG. 5 illustrates a main configuration of base station 100 according to Embodiment 1 of the claimed invention. Base station 100 transmits control signals for terminal 200 after mapping the control signals to a first resource region usable for a control channel or a data channel (R-PDCCH for a terminal, in this case) or in a second resource region usable for a control channel (a PDCCH, in this case). Base station 100 distributes a series of data to data resources in N transmission-scheduled subframes (where N is a natural number greater than or equal to two) and transmits the distributed data to terminal 200, Control signal generating section 103 generates scheduling control signals (DL grant, in this case) for allocating the data resource. Then, transmission controlling section 102 sets a control resource region for mapping the data resource and the scheduling control signals to a first resource region on a resource block group (RBG) formed of M resource blocks (PRB pair, in this case) (where M is a natural number greater than or equal to two) and being common between the transmission-scheduled subframes. Signal scheduling section 106 maps the series of data to the set data resources and scheduling control signals in the control resource region.

The resource region set as a control resource region in the first transmission-scheduled subframe of the N transmission-scheduled subframes is set as data resources in the transmission-scheduled subframes except for the first transmission-scheduled subframe.

Figure 6:
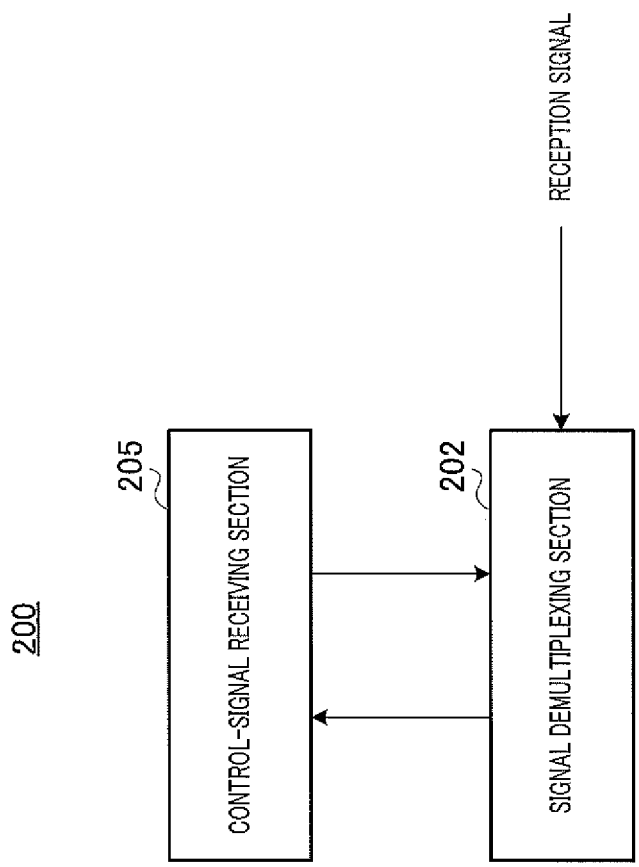
FIG. 6 is a main configuration diagram of a terminal according to Embodiment 1 of the claimed invention.

FIG. 6 illustrates a main configuration of terminal 200 according to Embodiment 1 of the claimed invention. Terminal 200 receives control signals from a transmission apparatus in a first resource region usable for a control channel or a data channel or in a second resource region usable for a control channel. Terminal 200 receives the series of data distributed to the data resources in the N transmission-scheduled subframes (where N is a natural number greater than or equal to two) and transmitted from base station 100. Then, control-signal receiving section 205 detects scheduling control signals for the data resource contained in the received signals. Signal demultiplexing section 202 extracts, from the received signals, a signal component corresponding to a data-component extraction target region in the resource block group (RBG) formed of M RBs (where M is a natural number greater than or equal to two) including resource blocks (which are a PRB pair, in this case) in which scheduling control signals are detected by control-signal receiving section 205 and being common between the transmission-scheduled subframes.

The resource region in which scheduling control signals are detected in the first transmission-scheduled subframe of the N transmission-scheduled subframes is set as the data-component extraction target region in the second and subsequent transmission-scheduled subframes.

(Configuration of Base Station 100)

Figure 7:
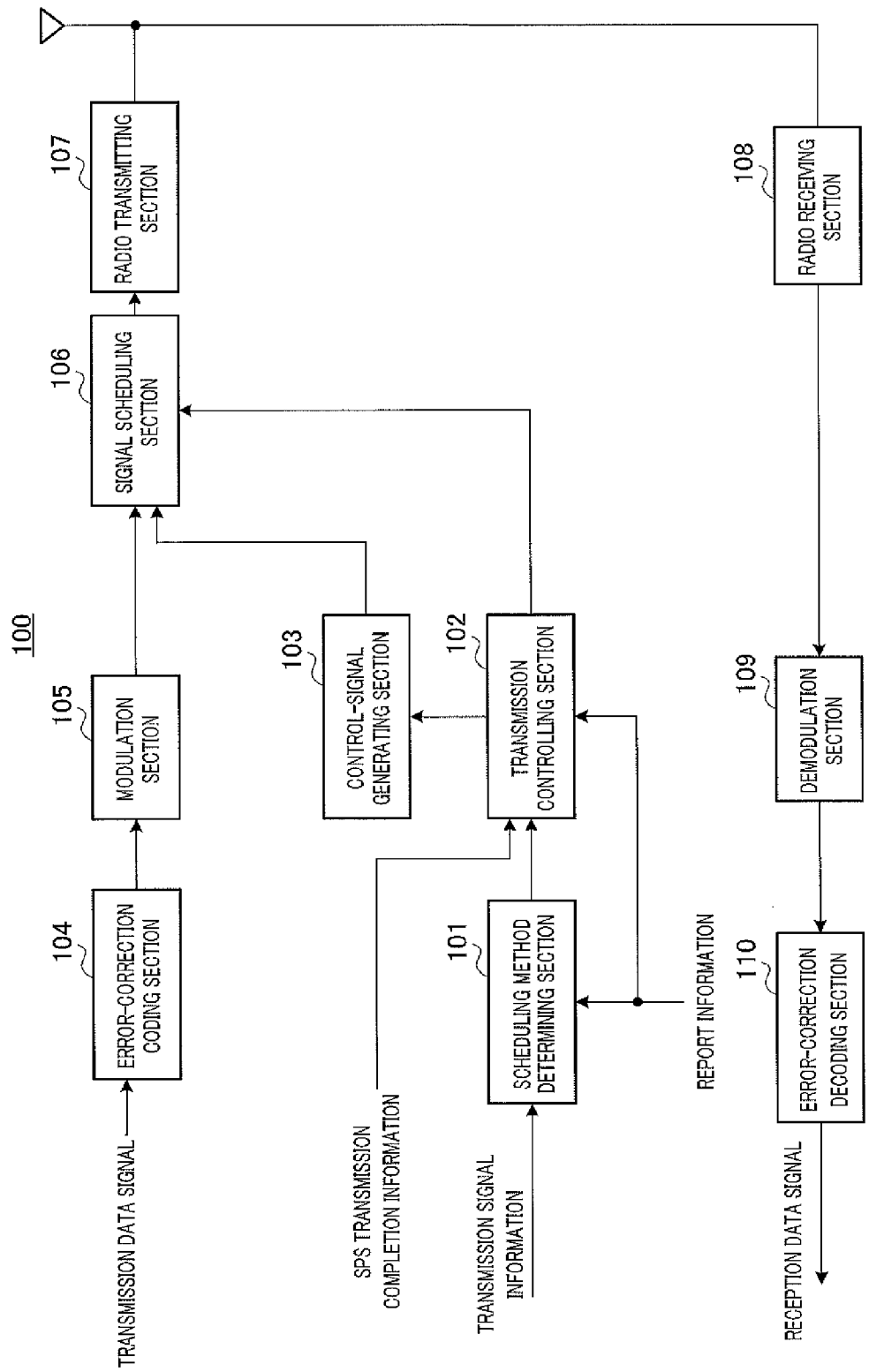
FIG. 7 is a block diagram illustrating a configuration of the base station according to Embodiment 1 of the claimed invention.

FIG. 7 is a block diagram illustrating a configuration of base station 100 according to Embodiment 1 of the claimed invention. In FIG. 7, base station 100 includes scheduling method determining section 101, transmission controlling section 102, control-signal generating section 103, error-correction coding section 104, modulation section 105, signal scheduling section 106, radio transmitting section 107, radio receiving section 108, demodulation section 109, and error-correction decoding section 110.

Scheduling method determining section 101 receives "transmission signal information" and "report information" transmitted from terminal 200. The "transmission signal information" represents the characteristics of the transmission data signals and contains, for example, the type of communication, such as speech communication or data communication, the data size of the transmission data signals, and/or the QoS (quality of service). The "report information" contains information such as a scheduling request and/or a buffering state report transmitted from terminal 200.

Scheduling determining section 101 selects "dynamic scheduling" or "SPS" as the resource scheduling method to be applied to the transmission of resource allocation target data signals on the basis of the transmission signal information and the report information. The identification information for the selected resource scheduling method (hereinafter, simply referred to as "scheduling identification information") is transmitted to transmission controlling section 102.

If there are any data signals to be transmitted, transmission controlling section 102 takes, as input, the scheduling identification information outputted from scheduling method determining section 101. Transmission controlling section 102 determines the "mapping resource pattern" of the control signals and the data signals based on the scheduling identification information, and outputs the determined information on the mapping resource pattern to signal scheduling section 106.

Figure 8:
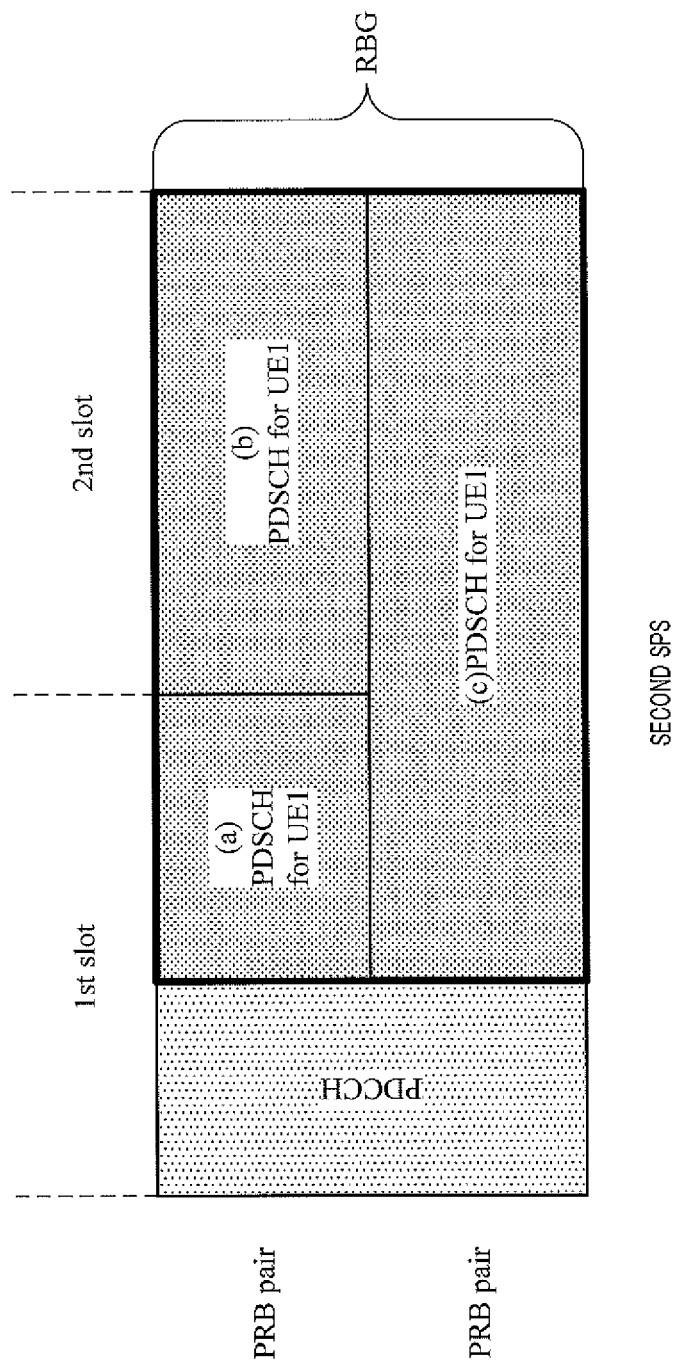
FIG. 8 is a diagram provided for describing a mapping resource pattern according to Embodiment 1 of the claimed invention.

The "mapping resource pattern" for the scheduling identification information indicating SPS has the following specific structure:

(1) mapping resource pattern 1 contains N transmission-scheduled subframes (where N is a natural number greater than or equal to two);

(2) in the first transmission-scheduled subframe of mapping resource pattern 1, region (a), which is described above, is allocated to a mapping resource for the DL grant, while regions (b) and (c) are allocated to data resources; and (3) in the second and subsequent transmission-scheduled subframes of mapping resource pattern 1, regions (a), (b), and (c) are all allocated to data resources (see FIG. 8). FIG. 8 illustrates a specific case of the transmission-scheduled subframes, where M is "2."

Upon reception of the scheduling identification information, transmission controlling section 102 outputs a DL-grant generation instruction together with the scheduling identification information to control-signal generating section 103. In a case where the received "report information" contains a scheduling request for the UL data signals, transmission controlling section 102 determines the resource for mapping the UL grant and outputs information on the resource to signal scheduling section 106 while outputting an UL-grant generation instruction to control-signal generating section 103.

Upon reception of SPS-transmission complete information, transmission controlling section 102 outputs the DL-grant generation instruction together with the SPS-transmission complete information to control-signal generating section 103.

Upon reception of the scheduling identification information and the DL-grant generation instruction, control-signal generating section 103 generates DL grant scrambled with an RNTI (radio network temporary identity) corresponding to the scheduling identification information and outputs the scrambled DL grant to signal scheduling section 106.

Upon reception of the UL-grant generation instruction, control-signal generating section 103 generates and sends UL grant to signal scheduling section 106.

Upon reception of the SPS-transmission complete information and the DL-grant generation instruction, control-signal generating section 103 generates DL grant containing the SPS-transmission complete information.

Error-correction coding section 104 receives transmission data signals, performs error-correction coding on the received transmission data signals, and outputs the coded transmission data signals to modulation section 105.

Modulation section 105 modulates the signals received from error-correction coding section 104 and outputs the modulated transmission data signals to signal scheduling section 106.

Signal scheduling section 106 maps the DL grant received from control-signal generating section 103 and the modulated transmission data signals received from modulation section 105 to the resource based on the mapping resource pattern from transmission controlling section 102. Signal scheduling section 106 maps the UL grant received from control-signal generating section 103 to the resource indicated by the information on the mapping resource for the UL grant received from transmission controlling section 102. Such mapping of the transmission data signals and the control signals to predetermined resources generates transmission signals. The transmission signals are outputted to radio transmitting section 107.

Radio transmitting section 107 performs radio transmission processing such as up-conversion on input signals and transmits the processed signals via an antenna.

Radio receiving section 108 receives signals transmitted from terminal 200 via the antenna, performs radio processing such as down-conversion on the received signals, and outputs the processed signals to demodulation section 109.

Demodulation section 109 demodulates the input signals and outputs the demodulated signals to error-correction decoding section 110.

Error-correction decoding section 110 decodes the input signals to the report information and received data signals from terminal 200. The obtained report information from terminal 200 is transmitted to scheduling method determining section 101 and transmission controlling section 102. The received data signals are transmitted to the subsequent functional component.

(Configuration of Terminal 200)

Figure 9:
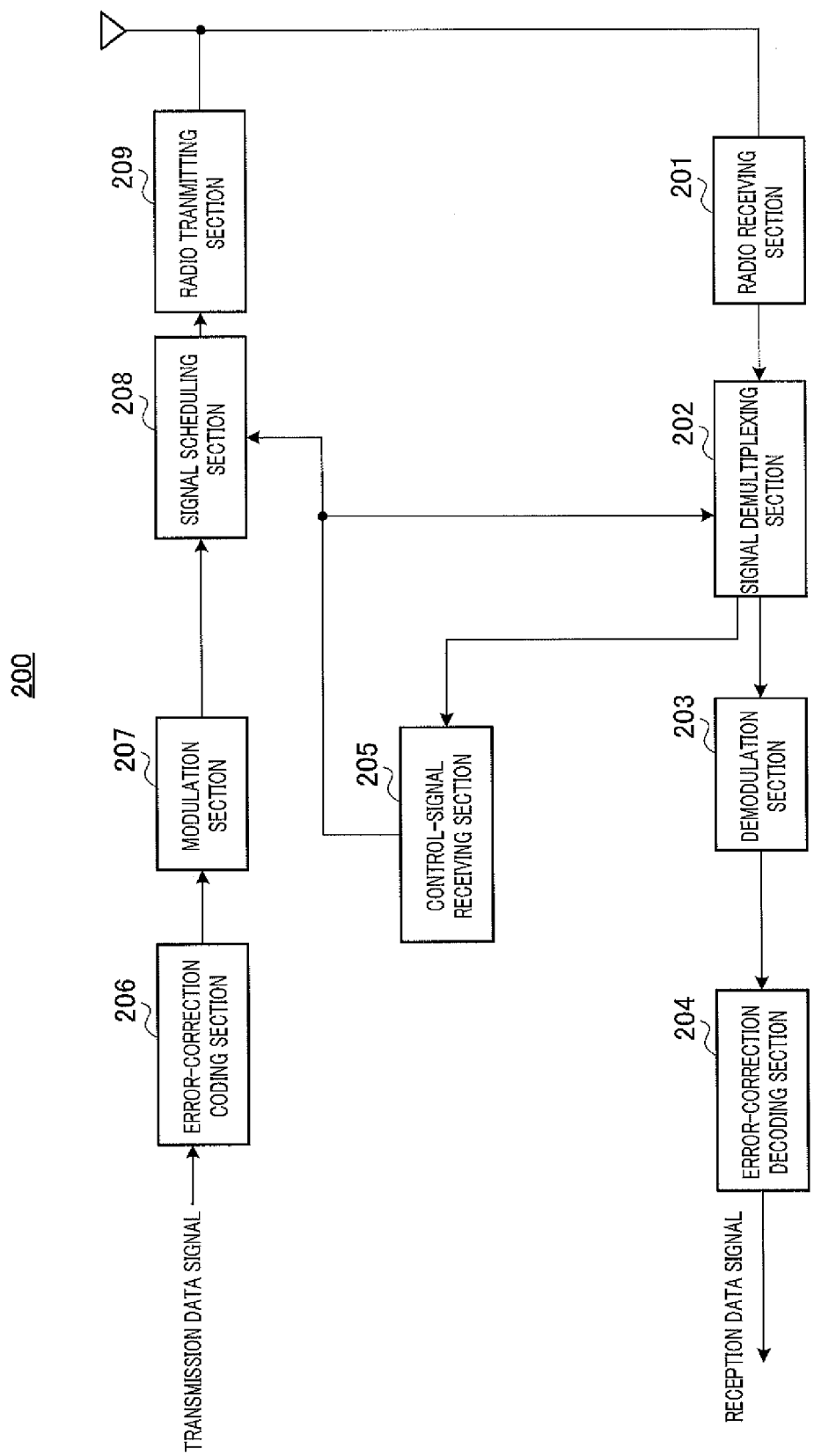
FIG. 9 is a block diagram illustrating a configuration of the terminal according to Embodiment 1 of the claimed invention.

FIG. 9 is a block diagram illustrating a configuration of terminal 200 according to Embodiment 1 of the claimed invention. Referring to FIG. 9, terminal 200 includes radio receiving section 201, signal demultiplexing section 202, demodulation section 203, error-correction decoding section 204, control-signal receiving section 205, error-correction coding section 206, modulation section 207, signal scheduling section 208, and radio transmitting section 209.

Radio receiving section 201 receives, via an antenna, signals transmitted from base station 100, performs radio processing such as down-conversion on the received signals, and outputs the processed signals to signal demultiplexing section 202.

Signal demultiplexing section 202 outputs the signals received from radio receiving section 201 to control-signal receiving section 205.

Signal demultiplexing section 202 extracts a signal component corresponding to the data resource indicated by the information on the mapping resource pattern from control-signal receiving section 205 (i.e., signal component corresponding to the DL data signals) from the received signal and outputs the extracted signals to demodulation section 203.

Demodulation section 203 demodulates the signals from signal demultiplexing section 202 and outputs the demodulated signals to error-correction decoding section 204.

Error-correction decoding section 204 decodes the demodulated signals outputted from demodulation section 203 and outputs the decoded received data signals.

Control-signal receiving section 205 extracts a signal component corresponding to the R-PDCCH region from the received signals to be received from signal demultiplexing section 202 and performs blind decoding on the extracted signal component to detect control signals (DL or UL grant) intended for the terminal 200. As described above, since the DL grant is scrambled with an RNTI for SPS or dynamic scheduling, the scheduling identification information can be obtained by descrambling the DL grant with an RNTI for SPS and an RNTI for dynamic scheduling.

In a case where the scheduling identification information in the detected DL grant indicates SPS, control-signal receiving section 205 outputs the information on the mapping resource pattern for SPS to signal demultiplexing section 202. The mapping resource pattern as described herein is the same as the one used for base station 100.

Control-signal receiving section 205 outputs the detected UL grant to signal scheduling section 208.

Error-correction coding section 206 uses the transmission data signals as input, performs error-correction coding on the transmission data signals, and outputs the coded signal to modulation section 207.

Modulation section 207 modulates the signals outputted from error-correction coding section 206 and outputs the modulated signals to signal scheduling section 208.

Signal scheduling section 208 maps the signals outputted from modulation section 207, in accordance with the UL grant to be received from control-signal receiving section 205 and outputs the mapped signals to radio transmitting section 209.

Radio transmitting section 209 performs radio transmission processing such as up-conversion on the input signals and transmits the processed signals via an antenna.

(Operations of Base Station 100 and Terminal 200)

The operations of base station 100 and terminal 200 configured in the manner described above will be described. Specifically, the description focuses on transmission of control signals through R-PDCCH for a terminal and SPS selected as the scheduling method.

Transmission controlling section 102 in base station 100 transmits information on mapping resource pattern 1 for SPS to signal scheduling section 106.

Control signal generating section 103 generates DL grant containing scheduling identification information and outputs the DL grant to signal scheduling section 106.

Signal scheduling section 106 maps the DL grant from control signal generating section 103 and the modulated transmission data signals from modulation section 105 to the resource based on mapping resource pattern 1 to be received from transmission controlling section 102. The mapping of such transmission data signals and control signals to a predetermined resource generates transmission signals. The transmission signals are then transmitted to terminal 200.

Control-signal receiving section 205 in terminal 200 extracts a signal component corresponding to the R-PDCCH region from the received signal to be received from signal demultiplexing section 202 and performs blind decoding on the extracted signal component to detect the control signals (DL or UL grant) intended for terminal 200.

Control-signal receiving section 205 outputs the information on mapping resource pattern 1 for SPS to signal demultiplexing section 202.

Signal demultiplexing section 202 extracts a signal component corresponding to the data resource indicated by the information on mapping resource pattern 1 from control-signal receiving section 205 (i.e., signal component corresponding to DL data signals) from the received signals and outputs the extracted signals to demodulation section 203.

According to the embodiment described above, base station 100 maps control signals for terminal 200 to a first resource region usable for a control channel or a data channel (R-PDCCH for a terminal, in this case) or to a second resource region usable for a control channel (PDCCH, in this case) and transmits the mapped signals. Base station 100 transmits a series of data to terminal 200 while distributing the series of data to the data resources in the N transmission-scheduled subframes (where N is a natural number greater than or equal to two). Transmission controlling section 102 sets the data resource and a control resource region to which scheduling control signals (i.e., DL grant, in this case) are mapped in the first resource region in a resource block group (RBG), which is formed of M resource blocks (each corresponding to a PRB pair, in this case) (where M is a natural number greater than or equal to two) and which is common between the transmission-scheduled subframes.

The resource region set as a control resource region in the first transmission-scheduled subframe of the N transmission-scheduled subframes is set as a data resource in the transmission-scheduled subframes except for the first transmission-scheduled subframe.

In this way, the resource region (region (a), in this case) set as a control resource in the first transmission-scheduled subframe can be prevented from being left unused in the second and subsequent transmission-scheduled subframes.

Specifically, in Embodiment 1, as described above, regions (a), (b), and (c) are all used as data resources in the second and subsequent transmission-scheduled subframes.

According to this embodiment, terminal 200 receives control signals from a transmission apparatus in a first resource region usable for a control channel or a data channel or in a second resource region usable for a control channel. Terminal 200 receives the series of data distributed to the data resources in the N transmission-scheduled subframes (where N is a natural number greater than or equal to two) and transmitted from base station 100. Signal demultiplexing section 202 extracts, from the received signals, a signal component corresponding to a data-component extraction target region in the resource block group (RBG) formed of M RBs (where M is a natural number greater than or equal to two) containing resource blocks (which are a PRB pair, in this case) in which scheduling control signals are detected by control-signal receiving section 205 and being common between the transmission-scheduled subframes.

The resource region from which scheduling control signals are detected in the first transmission-scheduled subframe of the N transmission-scheduled subframes is to be the data-component extraction target region in the second and subsequent transmission-scheduled subframes.

In this way, the resource region (region (a), in this case) set as a control resource in the first transmission-scheduled subframe can be prevented from being left unused in the second and subsequent transmission-scheduled subframes.

In particular, in Embodiment 1, as described above, regions (a), (b), and (c) are all data-component extraction target regions in the second and subsequent transmission-scheduled subframes.

Embodiment 2

Embodiment 2 relates to a variation of the mapping resource pattern corresponding to SPS.

Specifically, mapping resource pattern 2 according to Embodiment 2 has the following configuration:

(1) mapping resource pattern 2 includes N transmission-scheduled subframes (where N is a natural number greater than or equal to two);

(2) in the first transmission-scheduled subframe of mapping resource pattern 2, region (a), which is described above, is to be a mapping resource for DL grant, but regions (b) and (c) are not to be data resource; and (3) all regions (a), (b), and (c) are to be data resources in the second and subsequent transmission-scheduled subframes of mapping resource pattern 2.

Such mapping resource pattern 2 allows reception of data in the second and subsequent transmission-scheduled subframes to be uniform in size, which makes it easier for base station 100 to take the number of resources into consideration for determining an error rate.

Embodiment 3

Embodiment 3 aims at the second object described above. The base station and the terminal according to Embodiment 3 are identical to base station 100 and terminal 200 according to Embodiment 1, respectively, so that a description will be provided with reference to FIGS. 7 and 9.

In base station 100 according to Embodiment 3, if there are any data signals to be transmitted, transmission controlling section 102 takes, as input, the scheduling identification information outputted from scheduling method determining section 101. Transmission controlling section 102 determines the "mapping resource pattern" of the control signals and the data signals based on the scheduling identification information and outputs the determined information on the mapping resource pattern to signal scheduling section 106.

The "mapping resource pattern" for the scheduling identification information indicating SPS has the following configuration in particular:

(1) mapping resource pattern 3 includes N transmission-scheduled subframes (where N is a natural number greater than or equal to two);

(2) in the first transmission-scheduled subframe of mapping resource pattern 3, region (a), which is described above, is allocated to a mapping resource for DL grant, while regions among PRB pairs to be scheduled by the DL grant, excluding the allocated PRB pair and the PDCCH region, are allocated to the data resource; and (3) in the second and subsequent transmission-scheduled subframes of mapping resource pattern 3, the following regions are allocated to the data resource: regions among PRB pairs to be scheduled by the DL grant mapped to region (a) in the first transmission-scheduled subframe excluding the PRB pair set as a search space for the DL grant and PDCCH region.

FIGS. 10A and 10B are diagrams provided for describing mapping resource pattern 3. Specifically, FIGS. 10A and 10B illustrate a mapping resource pattern of four PRB pairs to be scheduled by the DL grant residing over two RBGs. As illustrated in FIG. 10A, region (b) and three regions (c) are allocated to a data resource in the first transmission-scheduled subframe of mapping resource pattern 3. On the other hand, as illustrated in FIG. 10B, if the aggregation of the search space for the DL grant is level 2, regions (c) in four PRB pairs to be scheduled by the DL grant excluding the search space for the DL grant is allocated to the data resource in the second and subsequent transmission-scheduled subframes of mapping resource pattern 3.

In terminal 200 according to Embodiment 3, signal demultiplexing section 202 extracts, from the received signals, a signal component corresponding to the data resource indicated by the information on mapping resource pattern 3 outputted from control-signal receiving section 205 (i.e., signal component corresponding to DL data signals), and outputs the extracted signals to demodulation section 203.

Such mapping resource pattern 3 enables mapping of UL grant in a PRB pair that is to be scheduled by DL grant in the second and subsequent transmission-scheduled subframes.

If UL grant is to be mapped in the first transmission-scheduled subframe, region (b) may be excluded from the data resource, and the UL grant may be mapped to region (b).

Mapping resource pattern 3 is particularly effective for a search space for UL grant with a high aggregation level. This is because a search space for UL grant with a high aggregation level requires a large number of resources for the scheduling by the UL grant, and thus, the UL grant cannot be assigned if the search space is blocked by the data resource.

Embodiment 4

Embodiment 4 aims at the second object described above. The base station and the terminal according to Embodiment 4 are identical to base station 100 and terminal 200 according to Embodiment 1, respectively, so that a description will be provided with reference to FIGS. 7 and 9.

In base station 100 according to Embodiment 4, if there are any data signals to be transmitted, transmission controlling section 102 takes, as input, the scheduling identification information outputted from scheduling method determining section 101. Transmission controlling section 102 determines the "mapping resource pattern" of the control signals and the data signals based on the scheduling identification information and transmits the determined information on the mapping resource pattern to signal scheduling section 106.

The "mapping resource pattern" for the scheduling identification information indicating SPS has the following configuration in particular:

(1) mapping resource pattern 4 includes N transmission-scheduled subframes (where N is a natural number greater than or equal to two);

(2) in the first transmission-scheduled subframe of mapping resource pattern 4, region (a), which is described above, is allocated to a mapping resource for the DL grant, while regions (b) and (c) are allocated to data resources (see FIG. 11A); and (3) in the second and subsequent transmission-scheduled subframes of mapping resource pattern 4, only region (c) is allocated to a data resource (see FIG. 11B).

In terminal 200 according to Embodiment 4, signal demultiplexing section 202 extracts, from the received signals, a signal component corresponding to the data resource indicated by the information on mapping resource pattern 4 outputted from control-signal receiving section 205 (i.e., signal component corresponding to DL data signals) and transmits the extracted signals to demodulation section 203.

Such mapping resource pattern 4 enables the mapping of UL grant in a PRB pair mapped in the first transmission-scheduled subframe with DL grant in the second and subsequent transmission-scheduled subframes. The UL grant can be mapped to a region other than the PRB that is to be scheduled by the DL grant, and an aggregation level higher than the aggregation level of the DL grant can be configured for the UL grant in such a case. Since the DL grant is mapped to a high channel quality resource, the UL grant can also be mapped to a high quality resource by mapping the DL and UL grants in the same PRB pair. Since the size of PDSCH is supposedly small for VoIP, which often uses SPS transmission, it is effective to multiplex data and the UL grant in the same RBG.

Embodiment 5

Embodiment 5 aims at the first and second objects described above. The base station and the terminal according to Embodiment 5 are identical to base station 100 and terminal 200 according to Embodiment 1, respectively, so that a description will be provided with reference to FIGS. 7 and 9.

In base station 100 according to Embodiment 5, if there are any data signals to be transmitted, transmission controlling section 102 takes, as input, the scheduling identification information from scheduling method determining section 101. Transmission controlling section 102 determines the "mapping resource pattern" of the control signals and the data signals based on the scheduling identification information and transmits the determined information on the mapping resource pattern to signal scheduling section 106.

The "mapping resource pattern" for the scheduling identification information indicating SPS has the following structure in particular:

(1) mapping resource pattern 5 contains N transmission-scheduled subframes (where N is a natural number greater than or equal to two);

(2) in the first transmission-scheduled subframe of mapping resource pattern 5, region (a), which is described above, is allocated to a mapping resource for the DL grant, while regions (b) and (c) are allocated to data resources (see FIG. 12A); and (3) In the second and subsequent transmission-scheduled subframes of mapping resource pattern 4, regions (a) and (c) are allocated to a data resource (see FIG. 12B).

In terminal 200 according to Embodiment 5, signal demultiplexing section 202 extracts, from the received signals, a signal component corresponding to the data resource indicated by the information on mapping resource pattern 5 outputted from control-signal receiving section 205 (i.e., signal component corresponding to a DL data signal) and transmits the extracted signal to demodulation section 203.

Such mapping resource pattern 5 enables the mapping of UL grant in a PRB pair mapped with DL grant in the first transmission-scheduled subframe in the second and subsequent transmission-scheduled subframes. The resource region (region (a), in this case) configured as a control resource in the first transmission-scheduled subframe can be prevented from being left unused in the second and subsequent transmission-scheduled subframes. Since the DL grant is mapped to a high channel quality resource, the UL grant can also be mapped to a high quality resource by mapping the DL and UL grants in the same PRB pair.

OTHER EMBODIMENTS (1) The mapping resource patterns described in Embodiments 1 to 5 may be switched from one to the other in accordance with the aggregation level of DL grant.

For example, transmission controlling section 102 and signal demultiplexing section 202 can switch between the mapping resource patterns in accordance with the magnitude relationship between the aggregation level of DL grant and the RBG size. Specifically, transmission controlling section 102 and signal demultiplexing section 202 select mapping resource pattern 4 or 5 when the aggregation level of DL grant is smaller than or equal to the RBG size. On the other hand, transmission controlling section 102 and signal demultiplexing section 202 select mapping resource pattern 3 when the aggregation level of DL grant is larger than the RBG size.

Alternatively, transmission controlling section 102 and signal demultiplexing section 202 can switch between the mapping resource patterns in accordance with only the aggregation level of DL grant. Specifically, transmission controlling section 102 and signal demultiplexing section 202 select mapping resource pattern 4 or 5 when the aggregation level of DL grant is 4 or 8. Meanwhile, transmission controlling section 102 and signal demultiplexing section 202 select mapping resource pattern 3 when the aggregation level of DL grant is 1 or 2.

(2) The mapping resource patterns according to Embodiments 1 to 5 can be switched from one to the other based on the resource region in which the UL grant is transmitted. Specifically, transmission controlling section 102 and signal demultiplexing section 202 select mapping resource pattern 1 or 2 when the UL grant transmitted in the PDCCH region. Alternatively, transmission controlling section 102 and signal demultiplexing section 202 select mapping resource pattern 3, 4, or 5 when the UL grant is transmitted in the R-PDCCH region. In this case, whether UL grant is transmitted in a PDCCH region or an R-PDCCH region is previously determined.

(3) In the embodiments described above, the R-PDCCH for DL grant may be the actual resource used for the transmission of DL grant to terminal 200, or the entire search space of DL grant, or include another search space having the same start position but a different aggregation level.

(4) The R-PDCCH according to the embodiments described above may also be referred to as an enhanced PDCCH.

(5) R-PDCCHs are used in an "interleaved" format in which R-PDCCHs for multiple terminals are interleaved and located on a single PRB, and in a "non-interleaved" format in which only R-PDCCH for a single terminal is located on a single PRB. The mapping resource patterns described in Embodiments 1 to 5 may be applied only to non-interleaved R-PDCCHs, (6) In the embodiments described above, terminal 200 attempts to detect DL grant for dynamic scheduling and DL grant indicating the termination of SPS in region (a) in all transmission-scheduled subframes. Terminal 200 performs no data transmission according to SPS and gives priority to data transmission according to dynamic scheduling in a transmission-scheduled subframe in which the DL grant for dynamic scheduling is detected. Meanwhile, terminal 200 performs no data transmission according to SPS in transmission-scheduled subframes subsequent to the transmission-scheduled subframe in which the DL grant indicating the termination of SPS is detected.

(7) In the embodiments described above, a description has been given of the case where the scheduling method is employed in which a region in an RBG other than the region to which the DL grant is mapped (i.e., region (a)) is allocated to PDSCH as PDSCH scheduling by DL grant. The claimed invention, however, is not limited to this case, and scheduling method described below may be applied.

<1> PDSCH Scheduling Method 1 by DL Grant

FIGS. 13A and B are diagrams provided for describing PDSCH scheduling method 1 by DL grant. As illustrated in FIG. 13A, when a resource allocation bit for the RBG is "1," region (b) is explicitly allocated to a data resource by DL grant. Region (c) is implicitly allocated to a data resource regardless of the value of resource allocation bit. As illustrated in FIG. 13B, when the resource allocation bit for the RBG is "0," region (c) is allocated to a data resource. In this way, even if UL grant is to be transmitted, PDSCH can be assigned to the RBG in which the DL grant is mapped.

When PDSCH scheduling method 1 is combined with mapping resource patterns 1 to 5, the mapping resource patterns may need to be modified. Incidentally, mapping resource pattern 2 can be applied in the same way as mapping resource pattern 1 since the only difference therebetween resides in the data resource in the first transmission-scheduled subframe.

When the resource allocation bit is "1," PDSCH scheduling method 1 and mapping resource patterns 1 to 5 can be combined without any modification of the mapping resource patterns.

Figures 14A, 14B:
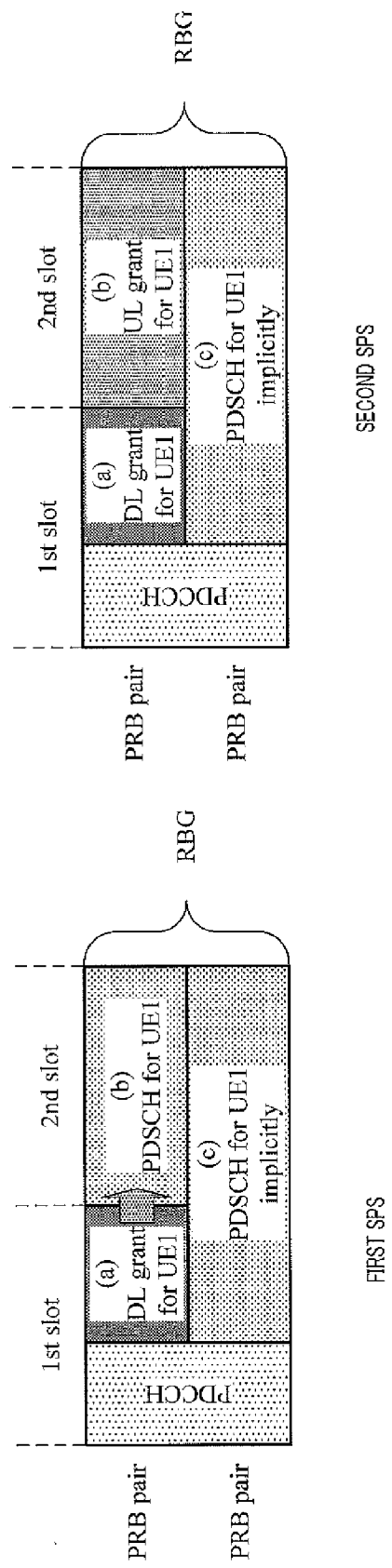
FIGS. 14A and 14B are diagrams provided for describing a mapping resource pattern according to PDSCH scheduling method 1.

When the resource allocation bit is "0," the mapping resource patterns may need to be modified. Specifically, when the resource allocation bit is "0," region (b) is not allocated to the data resource in the second and subsequent transmission-scheduled subframes in mapping resource pattern 1, as illustrated in FIG. 14B. Specifically, regions (a) and (c) are allocated to the data resources in the second and subsequent transmission-scheduled subframes.

Even when the resource allocation bit is "0," mapping resource patterns 3, 4, and 5 can be applied in the same way as in the case where the resource allocation bit is "1."

<2> PDSCH Scheduling Method 2 by DL Grant

Figure 15A:
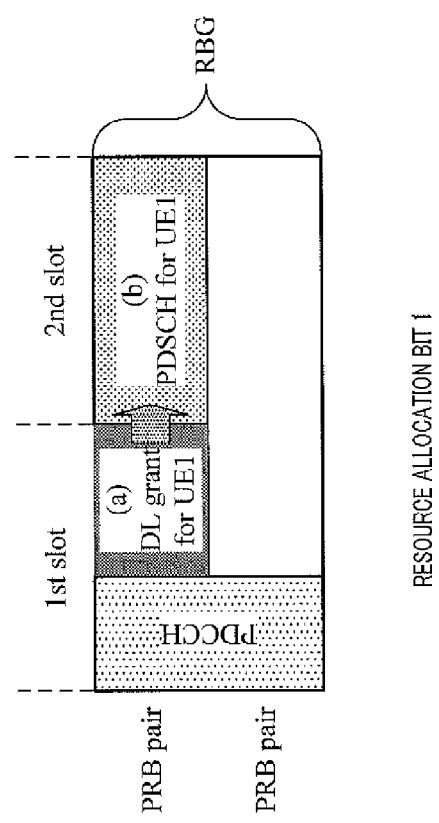
FIGS. 15A and 15B are diagrams provided for describing PDSCH scheduling method 2 by DL grant.
Figure 15B:
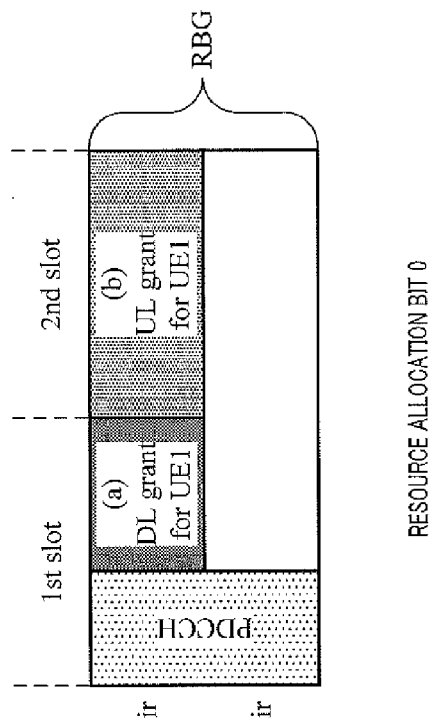

PDSCH scheduling method 2 by DL grant differs from PDSCH scheduling method 1 by DL grant in that no region (c) is allocated to a data resource (see FIGS. 15A and B).

When PDSCH scheduling 2 is combined with mapping resource patterns 1 to 5, the mapping resource patterns may need to be modified. Even when the resource allocation bit is "1," the mapping resource patterns may need to be corrected. There is no combination of PDSCH scheduling method 2 with mapping resource pattern 4, however.

Specifically, when the resource allocation bit is "1," regions (a) and (b) are allocated to the data resources in the second and subsequent transmission-scheduled subframes while region (c) is not allocated to a data resource in mapping resource pattern 1, as illustrated in FIG. 16B. Mapping resource pattern 2 can be applied in the same way as mapping resource pattern 1 since the only difference therebetween resides in the data resource in the first transmission-scheduled subframe.

When the resource allocation bit is "1," no modification is required in the second and subsequent transmission-scheduled subframes in mapping resource pattern 3.

When the resource allocation bit is "1," only region (b) is allocated to the data resource in the first transmission-scheduled subframe in mapping resource pattern 5, as illustrated in FIG. 17A, while only region (a) is allocated to the data resources in the second and subsequent transmission-scheduled subframes, as illustrated in FIG. 17B.

<3> PDSCH Scheduling Method 3 by DL Grant

PDSCH scheduling method 3 by DL grant differs from PDSCH scheduling 2 method by DL grant in that only region (c) is allocated to the data resource when resource allocation bit is "1" (see FIG. 18A).

When the resource allocation bit is "1," PDSCH scheduling method 3 by DL grant can be applied in the same way as the case where the resource allocation bit is "0" in PDSCH scheduling method 1 by DL grant.

<4> PDSCH Scheduling Method 4 by DL Grant

Region (c) is divided into a first slot region (c-1) and a second slot region (c-2) in PDSCH scheduling method 4.

Figure 19B:
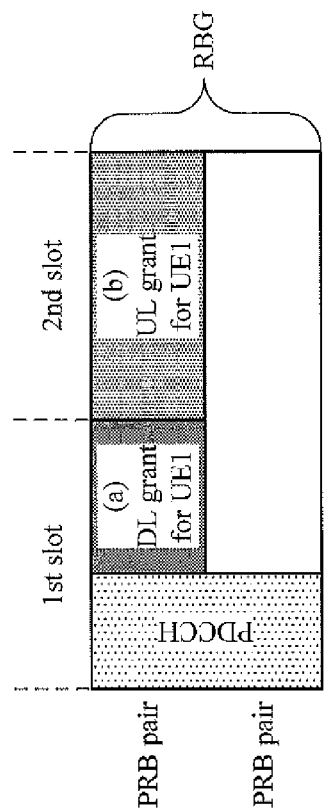
FIGS. 19A and 19B are diagrams provided for describing PDSCH scheduling method 4 by DL grant.
Figure 19A:
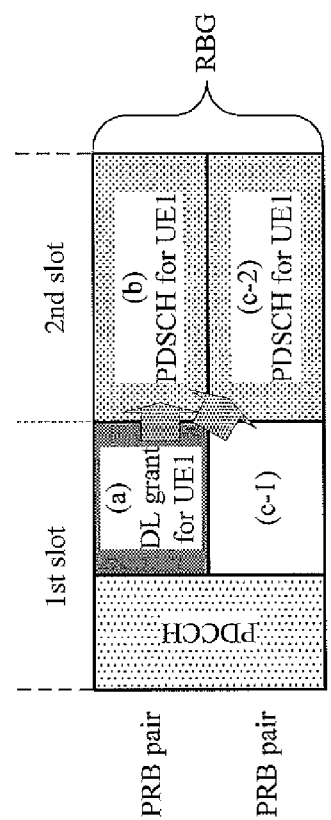

FIGS. 19A and B are provided for describing PDSCH scheduling method 4 by DL grant. As illustrated in FIG. 19A, regions (b) and (c-2) are allocated to the data resource by the DL grant when the resource allocation bit is "1." As illustrated in FIG. 19B, when the resource allocation bit is "0," PDSCH scheduling method 4 is applied in the same way as PDSCH scheduling method 2 by DL grant.

When PDSCH scheduling method 4 is combined with mapping resource patterns 1 to 5, the mapping resource patterns may need to be modified. Even when the resource allocation bit is "1," the mapping resource patterns may need to be modified.

Figure 20B:
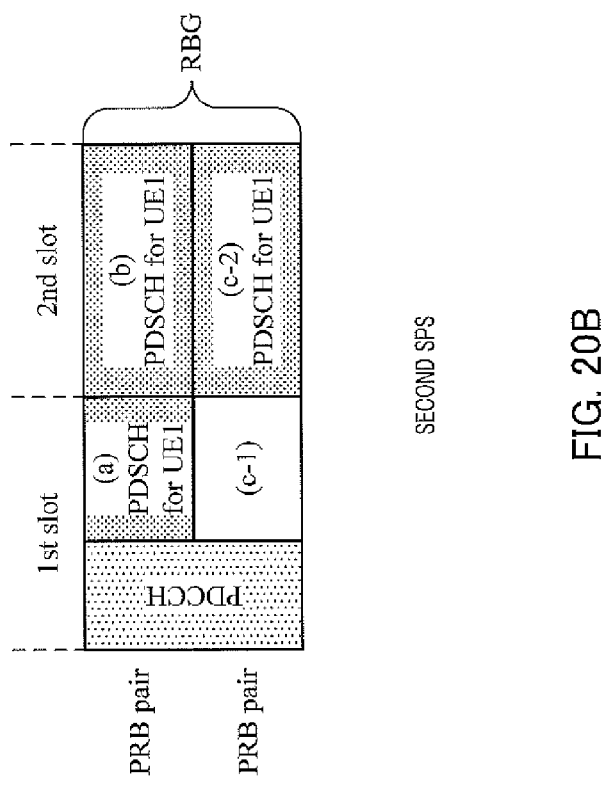
FIGS. 20A and 20B are diagrams provided for describing a mapping resource pattern according to PDSCH scheduling method 4.
Figure 20A:
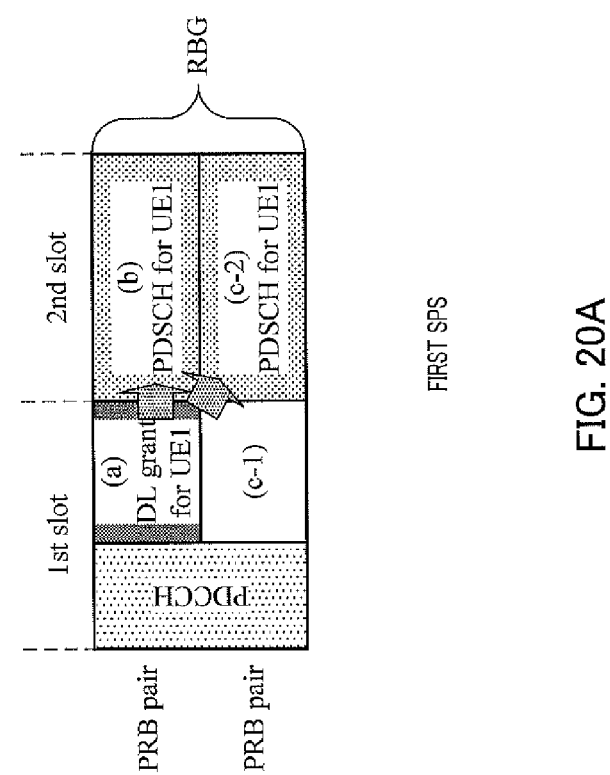

Specifically, when the resource allocation bit is "1," mapping resource pattern 1 is the same as the mapping resource pattern according to Embodiment 1, except that region (c-1) is excluded from the data resource, as illustrated in FIGS. 20A and B.

When the resource allocation bit is "1," mapping pattern 4 is the same as the mapping resource pattern according to Embodiment 4, except that region (c-1) is excluded from the data resource, as illustrated in FIGS. 21A and B.

Figure 22B:
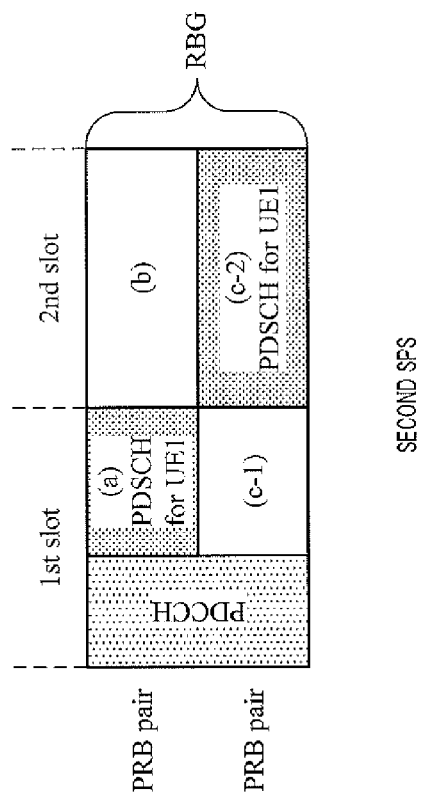
FIGS. 22A and 22B are diagrams provided for describing another mapping resource pattern according to PDSCH scheduling method 4.
Figure 22A:
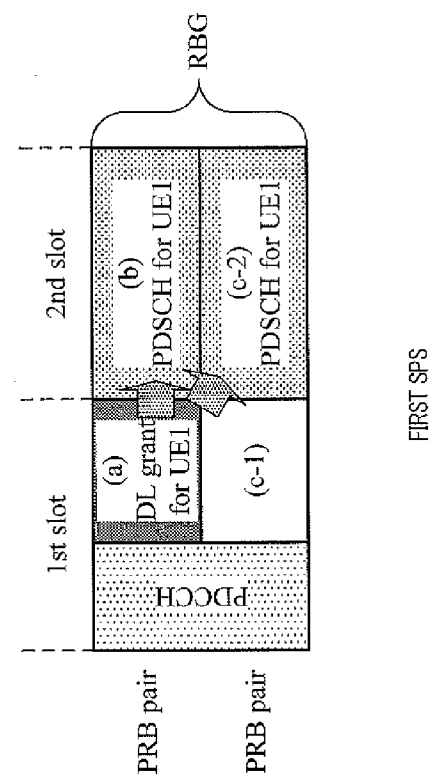

When the resource allocation bit is "1," mapping resource pattern 5 is the same as the mapping resource pattern according to Embodiment 5, except that region (c-1) is excluded from the data resource, as illustrated in FIGS. 22A and B.

<5> PDSCH Scheduling Method 5 by DL Grant

In PDSCH scheduling method 5, DL grant is located over a plurality of adjacent PRBs, as illustrated in FIGS. 23A and B. Thus, region (b) includes a plurality of sub-regions in PRB units. The UL grant is mapped to part of the sub-regions. That is, in PDSCH scheduling 5, the search space of DL grant differs from the search space of UL grant.

FIGS. 23A and B are diagrams provided for describing PDSCH scheduling method 5 by DL grant. As illustrated in FIG. 23A, when the resource allocation bit is "1," regions (b-2) and (c) to which no UL grant is mapped by the DL grant are allocated to data resources. Meanwhile, as illustrated in FIG. 23B, when the resource allocation bit is "0," all regions (a), (b), and (c) are excluded from the data resources.

When PDSCH scheduling method 5 is combined with mapping resource patterns 1 to 5, the mapping resource patterns may need to be modified. Even when the resource allocation bit is "1," the mapping resource patterns may need to be modified. PDSCH scheduling method 5 is not combined with mapping resource pattern 4 or 5.

Specifically, when the resource allocation bit is "1," regions (b-2) and (c) are allocated to the data resources in the first transmission-scheduled subframe in mapping resource pattern 1, as illustrated in FIG. 24A. In this case, regions (b-2) and (c), in addition to region (a), are allocated to the data resources in the second and subsequent transmission-scheduled subframes in mapping resource pattern 1, as illustrated in FIG. 24B. Mapping resource pattern 2 can be applied in the same way as mapping resource pattern 1 since the only difference therebetween resides in the data resource in the first transmission-scheduled subframe.

When the resource allocation bit is "1," no modification is required in the second and subsequent transmission-scheduled subframes in mapping resource pattern 3.

[8] In the embodiments described above, DL grant is mapped in the first slot, and UL grant is mapped in the second slot. That is, the resource to which the DL grant is mapped is separated from the resource to which the UL grant is mapped in the time domain. The claimed invention, however, it not limited thereto, and the resource to which the DL grant is mapped may be separated from the resource to which the UL grant is mapped in the frequency domain (i.e., subcarriers or PRB pairs).

<1> PDSCH Scheduling Method 6 by DL Grant

Figure 25B:
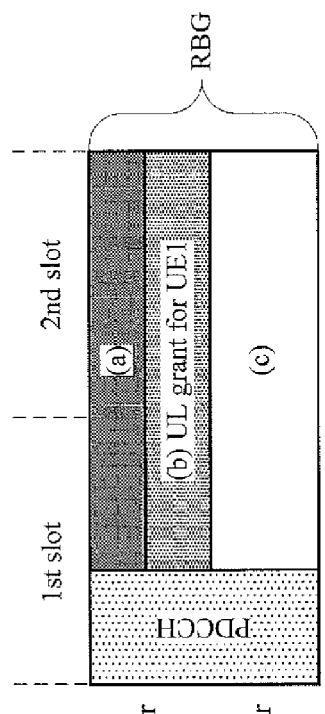
FIGS. 25A and 25B are diagrams provided for describing PDSCH scheduling method 6 by DL grant.
Figure 25A:
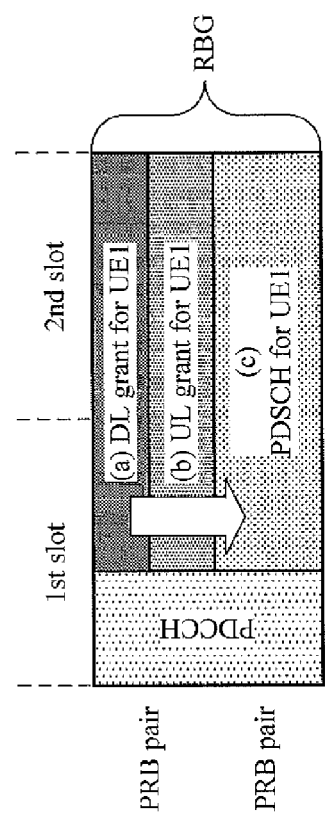

FIGS. 25A and B are provided for describing PDSCH scheduling method 6. As illustrated in FIG. 25A, the plurality of subcarriers of the allocated PRB are divided into two subcarrier blocks. One of the two subcarrier blocks corresponds to region (a) to which DL grant is mapped. The other subcarrier block of the two subcarrier blocks corresponds to region (b) to which UL grant is mapped.

When the resource allocation bit is "1" in PDSCH scheduling method 6, region (c) is allocated to the data resource, as illustrated in FIG. 25A, whereas region (c) is not allocated to the data resource when the resource allocation bit is "0" as illustrated in FIG. 25B.

Figures 26A, 26B:
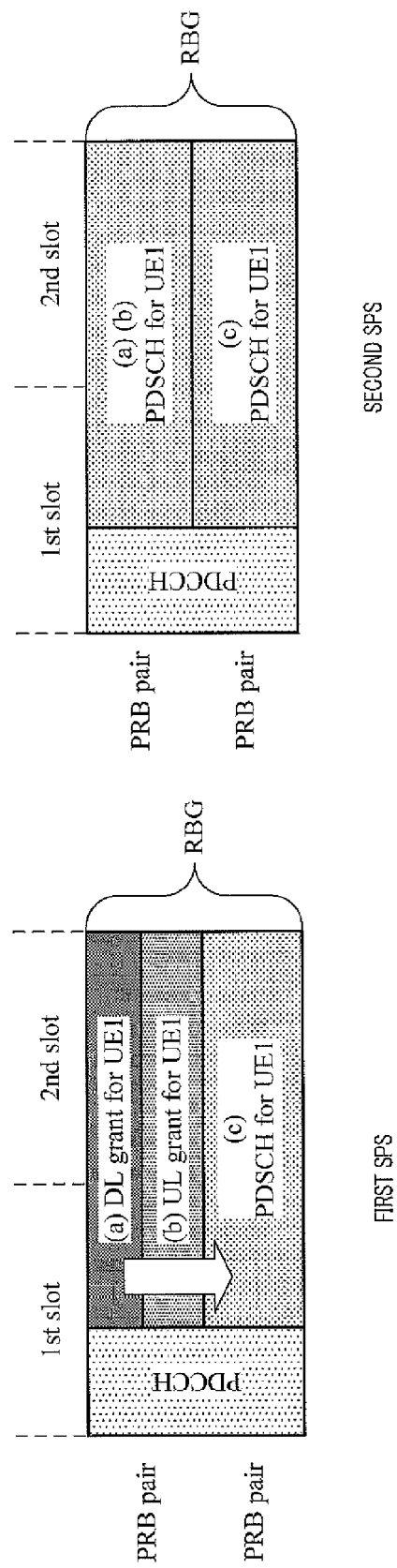
FIGS. 26A and 26B are diagrams provided for describing a mapping resource pattern according to PDSCH scheduling method 6.

In a case where mapping resource pattern 1 is applied to PDSCH scheduling method 6, the first transmission-scheduled subframe corresponds to the state of the first transmission-scheduled subframe illustrated in FIG. 26A, and the second and subsequent transmission-scheduled subframes correspond to the state of the second and subsequent transmission-scheduled subframes illustrated in FIG. 26B.

<2> PDSCH Scheduling Method 7 by DL Grant

Figures 27A, 27B:
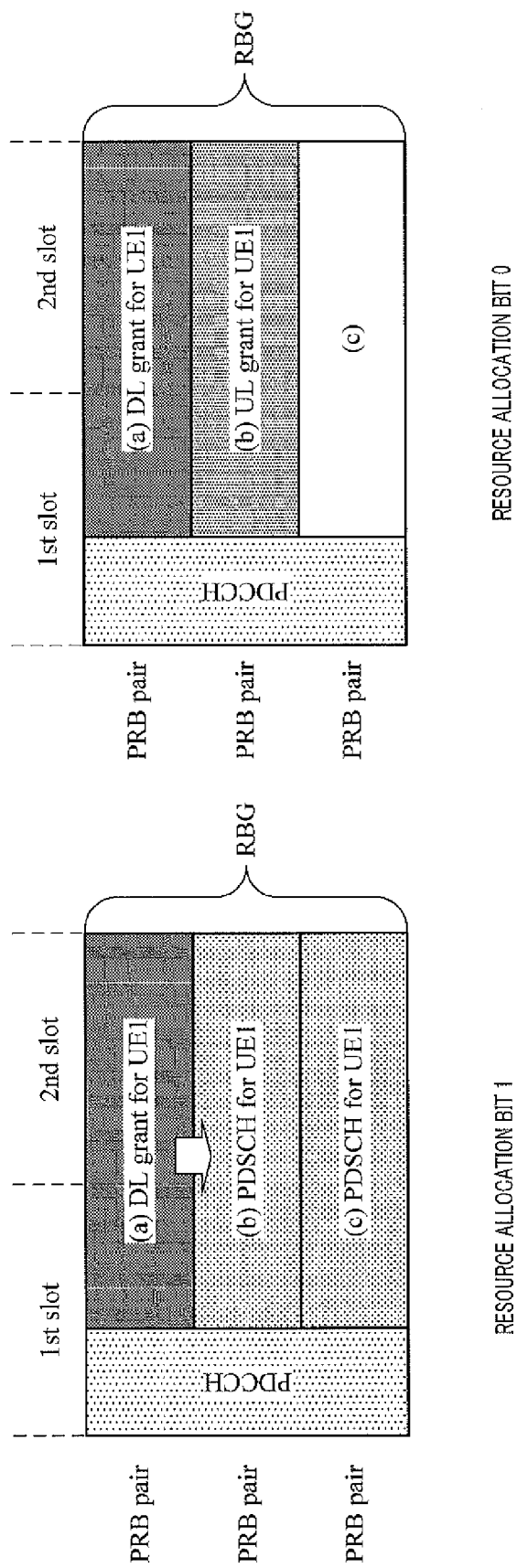
FIGS. 27A and 27B are diagrams provided for describing PDSCH scheduling method 7 by DL grant.

FIGS. 27A and B are diagrams provided for describing PDSCH scheduling method 7. As illustrated in FIG. 27A, the DL grant is mapped to region (a) other than the PDCCH region in one PRB pair. The DL grant allocates regions (b) and (c) other than the PDCCH region in the other two PRB pairs to data resources.

When the resource allocation bit is "1" in PDSCH scheduling method 7, regions (b) and (c) are allocated to the data resources as illustrated in FIG. 27A, whereas when the resource allocation bit is "0," the UL grant is mapped to region (b) as illustrated in FIG. 27B. In such a case, region (c) is not allocated to a data resource.

Figures 28A, 28B:
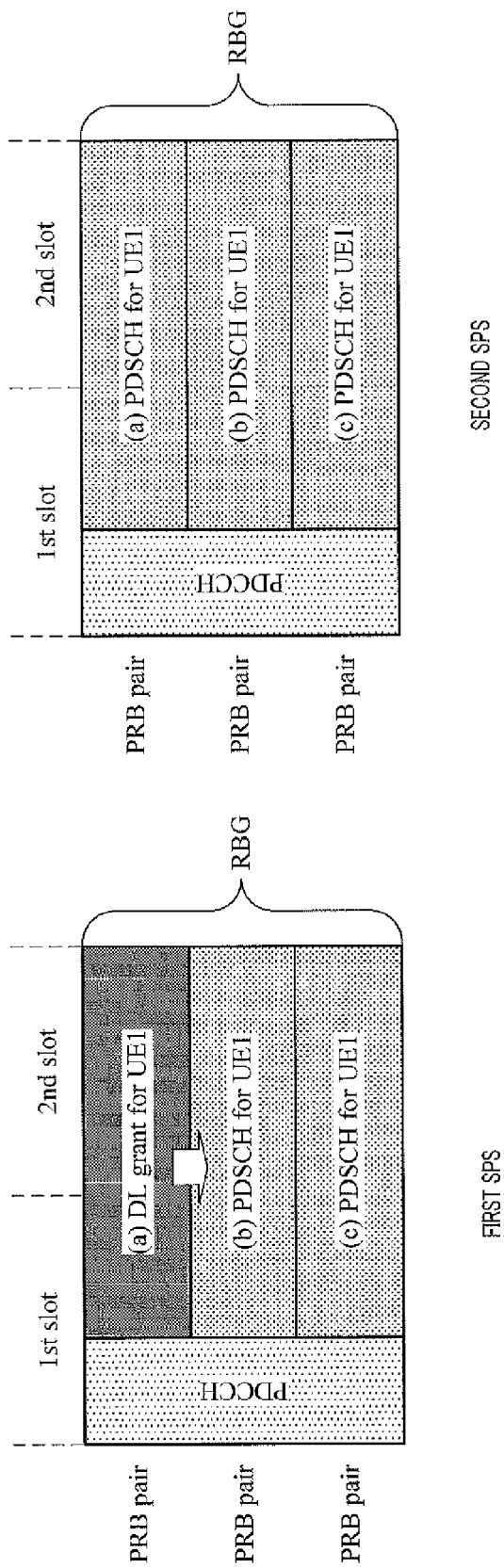
FIGS. 28A and 28B are diagrams provided for describing a mapping resource pattern according to PDSCH scheduling method 7.

When mapping resource pattern 1 is applied to PDSCH scheduling 7, the first transmission-scheduled subframe corresponds to the state of the first transmission-scheduled subframe illustrated in FIG. 28A, and the second and subsequent transmission-scheduled subframes correspond to the state of the second and subsequent transmission-scheduled subframes illustrated in FIG. 28B.

Figures 29A, 29B:
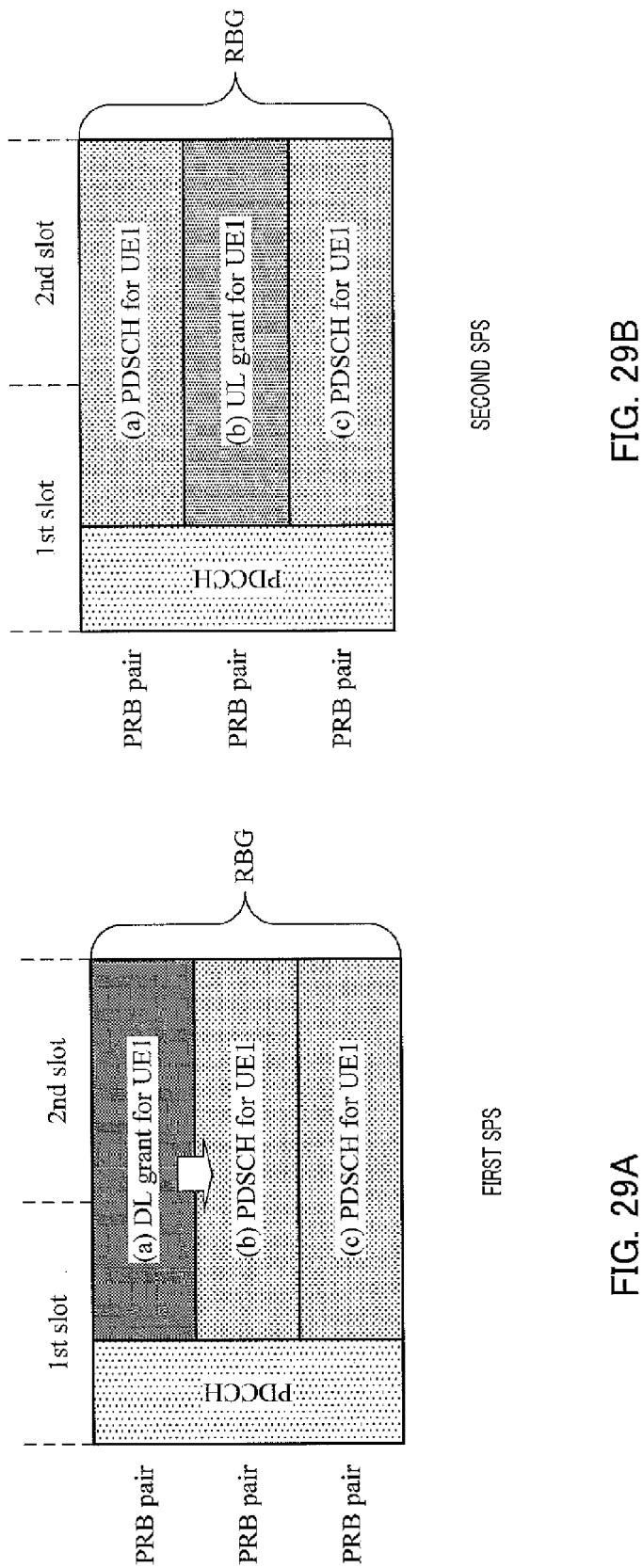
FIGS. 29A and 29B are diagrams provided for describing another mapping resource pattern according to PDSCH scheduling method 7.

When mapping resource pattern 3 is applied to PDSCH scheduling method 7, the first transmission-scheduled subframe corresponds to the state of the first transmission-scheduled subframe illustrated in FIG. 29A, and the second and subsequent transmission-scheduled subframes correspond to the state of the second and subsequent transmission-scheduled subframes illustrated in FIG. 29B. More specifically, the resources other than the search space for UL grant (i.e., regions (a) and (c) in FIG. 29B) are allocated to the data resources in the second and subsequent transmission-scheduled subframes.

The embodiments of the claimed invention described above are provided as hardware. The claimed invention can be achieved through software in cooperation with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-077943, filed on Mar. 31, 2011, including the specification, drawings and abstract, is incorporated herein by reference in its entirety.

INDUSTRIAL APPLICABILITY

The transmission apparatus, the reception apparatus, the transmission method, and the reception method according to the claimed invention are useful in that they enable transmission of a series of data while the data is distributed to data resources in N transmission subframes (where N is a natural number greater than or equal to two) when control signals are transmitted in a resource region usable for a control channel or data channel.

REFERENCE SIGNS LIST

100 Base station
101 Scheduling method determining section
102 Transmission controlling section
103 Control-signal generating section
104, 206 Error-correction coding section
105, 207 Modulation section
106, 208 Signal scheduling section
107, 209 Radio transmitting section
108, 201 Radio receiving section
109, 203 Demodulation section
110, 204 Error-correction decoding section
200 Terminal
202 Signal demultiplexing section
205 Control-signal receiving section

The invention claimed is:

1. A transmission apparatus that maps control signals for a reception apparatus to a first resource region usable for a control channel or a data channel or to a second resource region usable for a control channel, transmits the mapped signals, and transmits a series of data to the reception apparatus while distributing the series of data to data resources in N transmission subframes to be transmitted consecutively with a predetermined frame interval therebetween, where N is a natural number greater than or equal to two, the transmission apparatus comprising:

a generating section that generates scheduling control signals for the data resources;

a setting section that sets the data resources, and a control resource region to which the scheduling control signals are mapped in the first resource region in a resource block group (RBG); and a mapping section that maps the series of data to the set data resources and maps the scheduling control signals to the control resource region, wherein the setting section sets resource regions in the N transmission subframes such that the setting section sets the first resource region as the control resource region in the first transmission subframe of the N transmission subframes and sets the first resource region as the data resource in each of second to Nth transmission subframes subsequent to the first transmission subframe, the RBG is formed of M resource blocks (RBs), M being a natural number greater than or equal to two, and the RBG is common between the N transmission subframes, and the mapping section maps a downlink grant as the scheduling control signals to the first resource region set as the control resource region in the first transmission subframe, and maps downlink data to the first resource region set as the data resource in each of the second to Nth transmission subframes.

2. The transmission apparatus according to claim 1, wherein, the region of the RBG other than the second resource region includes a first region set as the control resource region in the first transmission subframe, a second region other than the first region in RBs including the first region, and a third region formed of RBs other than RBs including the first and second regions, and the setting section further sets the third region as the data resources in all of the N transmission subframes.

3. The transmission apparatus according to claim 2, wherein, the setting section sets the second and third regions as the data resources in the first transmission subframe, and the setting section sets all of the first, second, and third regions as the data resources in the transmission subframes except for the first transmission subframe.

4. The transmission apparatus according to claim 2, wherein, the setting section sets the second and third regions as the data resources in the first transmission subframe, and the setting section sets the first and third regions, but not the second region, as the data resources in the transmission subframes except for the first transmission subframe.

5. A reception apparatus that receives reception signals including control signals transmitted from a transmission apparatus through a first resource region usable for a control channel or a data channel or a second resource region usable for a control channel and receives a series of data being transmitted from the transmission apparatus while being distributed to data resources in N transmission subframes transmitted consecutively with a predetermined frame interval therebetween, where N is a natural number greater than or equal to two, the reception apparatus comprising:

a detecting section that detects scheduling control signals for the data resources included in the reception signals; and an extracting section that extracts, from the reception signals, a signal component in a data-component extraction target region corresponding to the data resource in a resource block group (RBG), wherein the extracting section treats resource regions in the N transmission subframes such that the extracting section treats, when a downlink grant mapped as the scheduling control signals are detected in the first resource region in the first transmission subframe of the N transmission subframes, the first resource region as the data-component extraction target region in each of second to Nth transmission subframes subsequent to the first transmission subframe to extract downlink data mapped in each of the second to Nth transmission subframes, and the RBG is formed of M resource blocks (RBs) including an RB in which the scheduling control signals are detected, M being a natural number greater than or equal to two, and the RBG is common between the N transmission subframes.

6. The reception apparatus according to claim 5, wherein, the region of the RBG other than the second resource region includes a first region in which the scheduling control signals are detected in the first transmission subframe, a second region other than the first region in RBs including the first region, and a third region formed of RBs other than RBs including the first and second regions, and the extracting section further treats the third region in all the N transmission subframes as the data-component extraction target region.

7. The reception apparatus according to claim 6, wherein, the extracting section treats the second and third regions as the data-component extraction target region in the first transmission subframe, and the extracting section treats all of the first, second, and third regions as the data-component extraction target region in the transmission subframes except for the first transmission subframe.

8. The reception apparatus according to claim 6, wherein, the extracting section treats the second and third regions as the data-component extraction target region in the first transmission subframe, and the extracting section treats the first and third regions, but not the second region, as the data-component extraction target region in the transmission subframes except for the first transmission subframe.

9. A transmission method of mapping control signals for a reception apparatus in a first resource region usable for a control channel or a data channel or in a second resource region usable for a control channel, transmitting the mapped signals, and transmitting a series of data to the reception apparatus while distributing the series of data to data resources in N transmission subframes to be transmitted consecutively with a predetermined frame interval therebetween, where N is a natural number greater than or equal to two, the method comprising:

generating scheduling control signals for the data resources;

setting the data resources, and a control resource region to which the scheduling control signals are mapped in the first resource region in a resource block group (RBG); and mapping the series of data to the set data resources and mapping the scheduling control signals to the control resource region, wherein resource regions are set in the N transmission subframes such that the first resource region is set as the control resource region in the first transmission subframe of the N transmission subframes and the first resource region is set as the data resources in each of second to Nth transmission subframes subsequent to the first transmission subframe, wherein the RBG is formed of M resource blocks (RBs), M being a natural number greater than or equal to two, and the RBG is common between the N transmission subframes, and wherein a downlink grant as the scheduling control signals is mapped to the first resource region set as the control resource region in the first transmission subframe, and downlink data are mapped to the first resource region set as the data resource in each of the second to Nth transmission subframes.

10. A reception method of receiving reception signals including control signals transmitted from a transmission apparatus through a first resource region usable for a control channel or a data channel or a second resource region usable for a control channel and receiving a series of data being transmitted from transmission apparatus while being distributed to data resources in N transmission subframes transmitted consecutively with a predetermined frame interval therebetween, where N is a natural number greater than or equal to two, the method comprising:

detecting scheduling control signals for the data resources included in the reception signals; and extracting, from the reception signals, a signal component in a data-component extraction target region corresponding to the data resources in a resource block group (RBG), wherein resource regions are treated in the N transmission subframes such that, when a downlink grant mapped as the scheduling control signals are detected in the first resource region in the first transmission subframe of the N transmission subframes, the first resource region is treated as the data-component extraction target region in each of second to Nth transmission subframes subsequent to the first transmission subframe to extract downlink data mapped in each of the second to Nth transmission subframes, and the RBG is formed of M resource blocks (RBs) including an RB in which the scheduling control signals are detected, M being a natural number greater than or equal to two, and the RBG is common between the N transmission subframes.

11. The transmission method according to claim 9, wherein, the region of the RBG other than the second resource region includes a first region set as the control resource region in the first transmission subframe, a second region other than the first region in RBs including the first region, and a third region formed of RBs other than RBs including the first and second regions, and further comprising:

setting the third region as the data resources in all of the N transmission subframes.

12. The transmission method according to claim 11, further comprising:

setting the second and third regions as the data resources in the first transmission subframe, and setting all of the first, second, and third regions as the data resources in the transmission subframes except for the first transmission subframe.

13. The transmission method according to claim 11, further comprising:

setting the second and third regions as the data resources in the first transmission subframe, and setting the first and third regions, but not the second region, as the data resources in the transmission subframes except for the first transmission subframe.

14. The reception method according to claim 10, wherein, the region of the RBG other than the second resource region includes a first region in which the scheduling control signals are detected in the first transmission subframe, a second region other than the first region in RBs including the first region, and a third region formed of RBs other than RBs including the first and second regions, and further comprising:

treating the third region in all the N transmission subframes as the data-component extraction target region.

15. The reception method according to claim 14, further comprising:

treating the second and third regions as the data-component extraction target region in the first transmission subframe, and treating all of the first, second, and third regions as the data-component extraction target region in the transmission subframes except for the first transmission subframe.

16. The reception method according to claim 14, further comprising:

treating the second and third regions as the data-component extraction target region in the first transmission subframe, and treating the first and third regions, but not the second region, as the data-component extraction target region in the transmission subframes except for the first transmission subframe.

* * * * *